United States Patent
Fujimura

(10) Patent No.: US 9,917,634 B2
(45) Date of Patent: *Mar. 13, 2018

(54) DEMULTIPLEXING APPARATUS, MULTIPLEXING APPARATUS, AND RELAY APPARATUS

(71) Applicant: Mitsubishi Electric Corporation, Chiyoda-ku (JP)

(72) Inventor: Akinori Fujimura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 274 days.

This patent is subject to a terminal disclaimer.

(21) Appl. No.: 14/767,790

(22) PCT Filed: Feb. 14, 2013

(86) PCT No.: PCT/JP2013/053538
§ 371 (c)(1),
(2) Date: Aug. 13, 2015

(87) PCT Pub. No.: WO2014/125600
PCT Pub. Date: Aug. 21, 2014

(65) Prior Publication Data
US 2015/0381266 A1  Dec. 31, 2015

(51) Int. Cl.
*H04B 7/185* (2006.01)
*H04B 7/204* (2006.01)
(Continued)

(52) U.S. Cl.
CPC ........... *H04B 7/18513* (2013.01); *H04B 3/36* (2013.01); *H04B 7/18515* (2013.01);
(Continued)

(58) Field of Classification Search
CPC ...... H04B 7/18513; H04B 15/00; H04B 3/36; H04B 7/18515; H04B 7/204; H04B 7/2045
See application file for complete search history.

(56) References Cited

U.S. PATENT DOCUMENTS 5,568,142 A  10/1996 Velazquez et al.
6,393,066 B1  5/2002 Moretti et al.
(Continued)

FOREIGN PATENT DOCUMENTS

JP  10-507891 A  7/1998
JP  2000-252937 A  9/2000
(Continued)

OTHER PUBLICATIONS

U.S. Appl. No. 14/440,764, filed May 5, 2015, Akinori Fujimura, et al.
(Continued)

*Primary Examiner* — Andrew Lai
*Assistant Examiner* — Hoyet H Andrews, III
(74) *Attorney, Agent, or Firm* — Oblon, McClelland, Maier & Neustadt, L.L.P.

(57) ABSTRACT

A relay apparatus includes a reception analog filter that extracts a desired signal from a received signal, an A/D converter that converts the signal after passage through the reception analog filter into a digital signal, a demultiplexing unit that demultiplexes the digital signal converted by the A/D converter into m signals, a reception-side compensating unit that digitally compensates for an analog characteristic of the reception analog filter with respect to the m signals demultiplexed by the demultiplexing unit, and a multiplexing unit that multiplexes the m signals digitally compensated by the reception-side compensating unit. The reception-side compensating unit further demultiplexes each of x signals (Continued)

not sufficiently compensated among the digitally-compensated m signals into k signals, digitally compensates for the analog characteristic of the reception analog filter, and multiplexes the k signals after the digital compensation.

23 Claims, 17 Drawing Sheets

(51) Int. Cl.
   *H04B 3/36* (2006.01)
   *H04B 15/00* (2006.01)
(52) U.S. Cl.
   CPC ......... *H04B 7/2041* (2013.01); *H04B 7/2045* (2013.01); *H04B 15/00* (2013.01)

(56) References Cited

U.S. PATENT DOCUMENTS

| | | | |
|---|---|---|---|
| 6,516,028 B1 | 2/2003 | Kobayashi | |
| 7,120,516 B2* | 10/2006 | Hagino | D05B 19/105 112/102.5 |
| 7,542,716 B2* | 6/2009 | Bell | H04B 7/18515 455/3.02 |
| 8,064,920 B2* | 11/2011 | Bell | H04B 7/18515 455/452.1 |
| 8,774,731 B2 | 7/2014 | Brown et al. | |
| 9,473,236 B2* | 10/2016 | Fujimura | H04B 17/40 |
| 2010/0220778 A1* | 9/2010 | Fuse | H03D 7/00 375/226 |
| 2012/0002701 A1* | 1/2012 | Morris | H04B 1/707 375/130 |
| 2012/0002703 A1* | 1/2012 | Yamashita | H04L 5/0044 375/133 |
| 2014/0036765 A1* | 2/2014 | Fujimura | H04B 7/18515 370/317 |
| 2014/0226555 A1 | 8/2014 | Bell et al. | |
| 2015/0244450 A1* | 8/2015 | Wajcer | H04B 7/15585 375/214 |
| 2015/0295636 A1 | 10/2015 | Fujimura et al. | |

FOREIGN PATENT DOCUMENTS

| | | |
|---|---|---|
| JP | 3676576 B2 | 7/2005 |
| JP | 2006-516867 A | 7/2006 |
| JP | 4842186 B2 | 12/2011 |
| JP | 2012-004801 A | 1/2012 |
| JP | 2012-519985 A | 8/2012 |

OTHER PUBLICATIONS

International Search Report dated Mar. 12, 2013, in PCT/JP2013/053538, filed Feb. 14, 2014.

Hitoshi Kiya, "Multi-rate Signal Processing", Shokodo. First edition issued in Oct. 1995, [3 pages].

Akinori Fujimura, et al., "A Study of Digital Demultiplexer/ Multiplexer for Flexible Regenerative Transponders", 2011, The Institute of Electronics, Information and Communication Engineers Communication Society Conference Aug. 3, 2010, [2 pages].

* cited by examiner

DEMULTIPLEXING APPARATUS, MULTIPLEXING APPARATUS, AND RELAY APPARATUS

FIELD

The present invention relates to a demultiplexing apparatus that demultiplexes a plurality of signals having a variety of bandwidths, a multiplexing apparatus that multiplexes a plurality of signals, and a relay apparatus.

BACKGROUND

To realize effective use of a frequency in satellite communication, an increase in a capacity of a satellite system, and the like, there has been proposed a relay satellite mounted with a digital channelizer that relays data from a plurality of uplink beams to a plurality of downlink beams. A technology concerning the relay satellite mounted with the digital channelizer is disclosed in Patent Literature 1.

In the relay satellite, a reception analog filter is present at a pre-stage of an A/D converter that analog-digital converts an uplink beam signal and a transmission analog filter is present at a post stage of a D/A converter that digital-analog converts a downlink beam signal. In the relay satellite mounted with the digital channelizer, it is necessary to increase an out-band attenuation amount of the reception analog filter to prevent uplink signals from interfering with one another. Similarly, it is necessary to increase an out-band attenuation amount of the transmission analog filter to prevent downlink signals from interfering with one another. Further, because the filters allow various communication waves to pass, high in-band flatness is also required. In general, there is a limit in simultaneously realizing such a high out-band attenuation amount and high in-band flatness in an analog filter alone because the size of an analog circuit increases and adjustment points also increases to be complicated.

As measures against this problem, Patent Literatures 2 and 3 below disclose a technology for digitally compensating for amplitude characteristics and group delay characteristics of a reception analog filter and a transmission analog filter. Required performance of an analog filter can be reduced by mounting a digital compensation circuit in a relay satellite and compensating for, with the digital compensation circuit, phase nonlinearity and the like due to an in-band amplitude error and a group delay deviation of the analog filter. Consequently, it is made possible to attain a high out-band attenuation amount and high in-band flatness while securing realizability of the analog filter. However, in Patent Literatures 2 and 3 below, because a digital compensation circuit needs to be additionally mounted on the relay satellite, there is a problem in that a circuit size and power consumption of the relay satellite increase.

As measures against the problem, Patent Literature 4 and Non Patent Literature 1 below disclose a technology for, after once demultiplexing a signal to be compensated, applying compensations to demultiplexed signals and multiplexing the signals again.

CITATION LIST

Patent Literature

Patent Literature 1: Japanese Translation of PCT Application No. 2006-516867
Patent Literature 2: Japanese Patent No. 3676576
Patent Literature 3: Japanese Patent No. 4842186
Patent Literature 4: Japanese Translation of PCT Application No. 2012-519985

Non Patent Literature

Non Patent Literature 1: Hitoshi Kiya, "Multi-rate Signal Processing", pp 90 to 91, Shokodo, First edition issued in October 1995

SUMMARY

Technical Problem

However, according to the conventional technologies (Patent Literature 4 and Non Patent Literature 1), to realize satisfactory compensation performance, it is necessary to secure a large demultiplexing/multiplexing number. Therefore, there is a problem in that an increase in a circuit size of a digital section is caused.

The present invention has been devised in view of the above and it is an object of the present invention to obtain a demultiplexing apparatus, a multiplexing apparatus, and a relay apparatus that can simultaneously realize a high out-band attenuation amount and high in-band flatness while suppressing an increase in a circuit size.

Solution to Problem

To solve the problems explained above and attain the object, the present invention provides a demultiplexing apparatus including: a reception analog filter that extracts a desired signal from a received signal; an A/D conversion unit that converts a signal after passage through the reception analog filter into a digital signal; a demultiplexing unit that demultiplexes the digital signal converted by the A/D conversion unit into m signals; a reception-side compensating unit that digitally compensates for an analog characteristic of the reception analog filter with respect to the m signals demultiplexed by the demultiplexing unit; and a multiplexing unit that multiplexes the m signals digitally compensated by the reception-side compensating unit. The reception-side compensating unit further demultiplexes each of x signals not sufficiently compensated among the digitally compensated m signals into k signals, digitally compensates for an analog characteristic of the reception analog filter, and multiplexes the k signals after the digital compensation.

Advantageous Effects of Invention

The demultiplexing apparatus, the multiplexing apparatus, and the relay apparatus according to the present invention attains an effect that it is possible to simultaneously realize a high out-band attenuation amount and high in-band flatness while suppressing an increase in a circuit size.

DESCRIPTION OF EMBODIMENTS

Exemplary embodiments of the present invention are explained in detail below with reference to the drawings. Note that the present invention is not limited by the embodiments.

First Embodiment

In this embodiment, a demultiplexing apparatus, a multiplexing apparatus, and a relay apparatus including the demultiplexing apparatus and the multiplexing apparatus that simultaneously realize a high out-band attenuation amount and high in-band flatness while suppressing an increase in a circuit size are explained.

Figure 1:
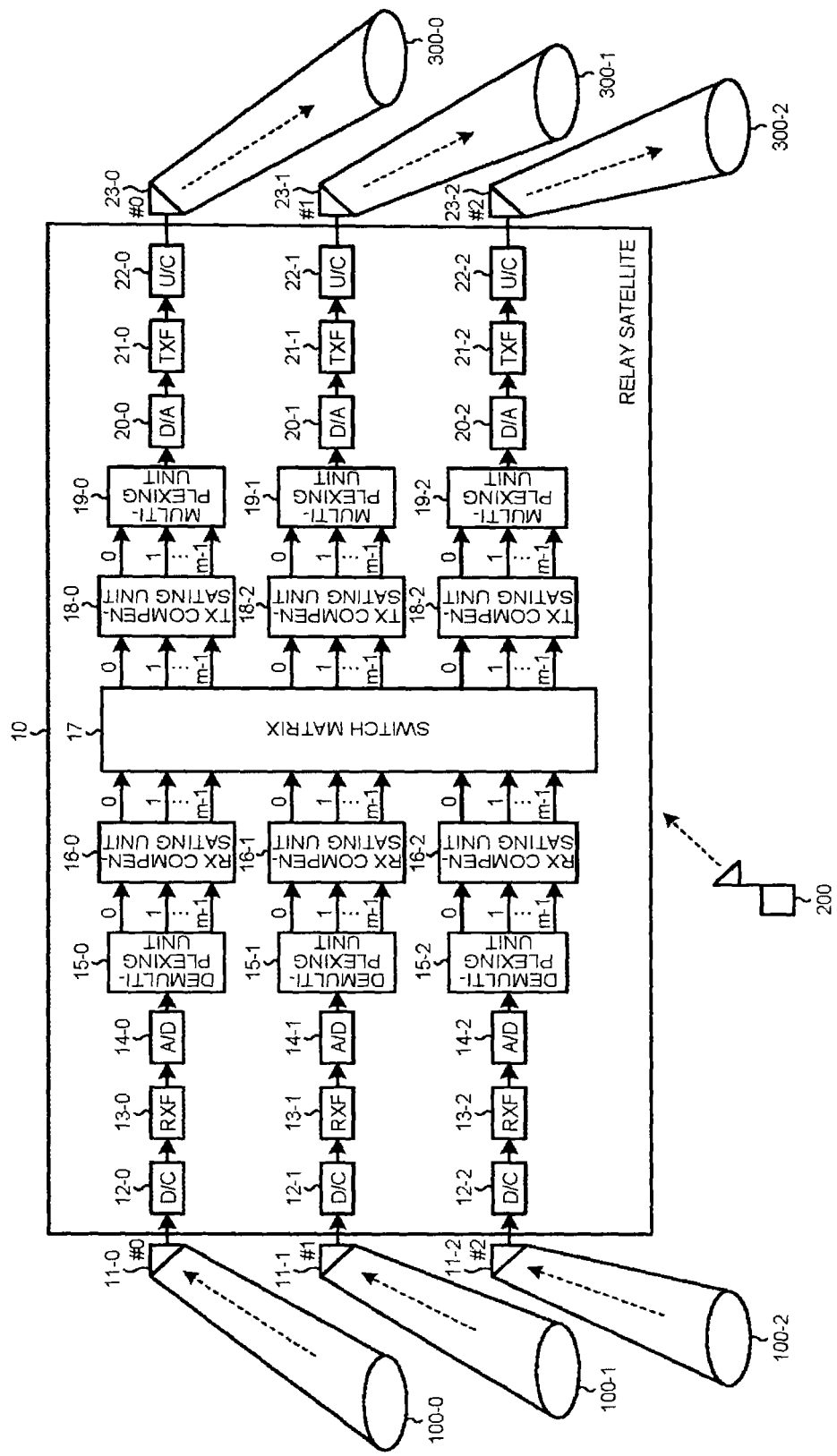
FIG. 1 is a diagram showing a configuration example of a demultiplexing apparatus, a multiplexing apparatus, and a relay apparatus including the demultiplexing apparatus and the multiplexing apparatus in a first embodiment.

FIG. 1 is a diagram showing a configuration example of the demultiplexing apparatus, the multiplexing apparatus, and the relay apparatus including the demultiplexing apparatus and the multiplexing apparatus in this embodiment. The relay apparatus shown in FIG. 1 is mounted on, for example, a relay satellite 10 and relays multicarrier signals transmitted from the ground. At this point, the relay apparatus demultiplexes the received signals and, after rearranging the signals according to necessity, multiplexes and transmits the signals.

The relay satellite 10 includes reception antennas 11-0 to 11-2, down-converters (D/Cs) 12-0 to 12-2, reception analog filters (RXFs) 13-0 to 13-2, A/D converters (A/Ds) 14-0 to 14-2, demultiplexing units 15-0 to 15-2, reception-side compensating (RX compensating) units 16-0 to 16-2, a switch matrix 17, transmission-side compensating (TX compensating) units 18-0 to 18-2, multiplexing units 19-0 to 19-2, D/A converters (D/As) 20-0 to 20-2, transmission analog filters (TXFs) 21-0 to 21-2, up-converters (U/Cs) 22-0 to 22-2, and transmission antennas 23-0 to 23-2.

As an example, one demultiplexing apparatus is configured by a reception antenna 11-$n$ (n=0, 1, or 2) to a reception-side compensating (RX compensating) unit 16-$n$ and one multiplexing apparatus is configured by a multiplexing unit 19-$n$ to a transmission antenna 23-$n$. Note that, further, the demultiplexing apparatus can be configured by adding the multiplexing unit 19-$n$ and the multiplexing apparatus can be configured by adding the demultiplexing unit 15-$n$. The relay satellite 10 includes demultiplexing apparatuses as many as or more than input ports (beam areas on an input side) and includes multiplexing apparatuses as many as or more than the number of output ports (beam areas on an output side).

The relay satellite 10 receives uplink signals from beam areas 100-0, 100-1, and 100-2 and, after performing various kinds of processing (demultiplexing processing, multiplexing processing, and the like) explained below, transmits the uplink signals to beam areas 300-0, 300-1, and 300-2 as downlink signals. Note that the relay satellite 10 is connected to a control station 200. The control station 200 performs a change instruction for internal setting, an operation instruction, and the like for the relay satellite 10.

The reception antenna 11-$n$ receives an uplink signal from a beam area 100-$n$.

A down-converter 12-$n$ multiplies the uplink signal received by the reception antenna 11-$n$ with a local signal generated inside the satellite.

A reception analog filter (RXF) 13-$n$ extracts a baseband signal among signals after the multiplication in the down-converter 12-$n$.

An A/D converter 14-$n$ samples the baseband signal extracted by the reception analog filter (RXF) 13-$n$.

A demultiplexing unit 15-$n$ demultiplexes a digital signal input from the A/D converter 14-$n$ into m (0 to m−1) signals.

A reception-side compensating (RX compensating) unit 16-$n$ applies, to m demultiplexed data output from the demultiplexing unit 15-$n$, digital amplitude/phase compensation for cancelling an amplitude/phase error of the reception analog filter (RXF) 13-$n$ at the pre-stage. Detailed operations are explained later.

The switch matrix 17 switches signals input from a plurality of processing units (the reception-side compensating (RX compensating) units 16-0, 16-1, and 16-2) at the pre-stage and outputs the signals to a plurality of processing units (transmission-side compensating (TX compensating) units 18-0, 18-1, and 18-2 explained below) at the post stage. Specifically, the switch matrix 17 rearranges the signals input from the processing units at the pre-stage in a frequency direction and allocates the signals to output ports for desired beam areas and outputs the signals to the processing units at the post stage connected to the output ports for the desired beam areas.

A transmission-side compensating (TX compensating) unit 18-$n$ further applies, to m multiplexed data to be given to a multiplexing unit **19-*n* at the post stage, digital inverse amplitude/phase compensation for cancelling an amplitude/phase error of a transmission analog filter (TXF) 21-*n*** located at the post stage. Detailed operations are explained later.

The multiplexing unit **19-*n* multiplexes m demultiplexed data subjected to the inverse amplitude/phase compensation by the transmission-side compensating (TX compensating) unit 18-*n*** into one wave (signal).

A D/A converter **20-*n* converts a digital signal output from the multiplexing unit 19-*n*** into an analog signal.

The transmission analog filter (TXF) **21-*n* allows only a baseband component of a signal output from the D/A converter 20-*n* to pass and removes unnecessary waves such as harmonics. An amplitude/phase characteristic of the signal passed through the transmission analog filter (TXF) 21-*n* is planarized by the inverse amplitude/phase compensation by the transmission-side compensating (TX compensating) unit 18-*n***.

An up-converter **22-*n* converts an analog baseband signal output from the transmission analog filter (TXF) 21-*n*** into a signal in a radio frequency band.

A transmission antenna **23-*n* transmits the signal output from the up-converter 22-*n* to a beam area 300-*n*** as a downlink signal.

Note that the beams areas 100-0, 100-1, and 100-2 of the uplink and the beam areas 300-0, 300-1, and 300-2 of the downlink can be geographically the same areas (places). In FIG. 1, the number of the components (the reception antennas, the down-converters, the A/D converters, the transmission antennas, and the like) of the relay satellite 10 is three (the number of input ports=3 and the number of output ports=3). However, this is an example. The number of the components is not limited to the number shown in FIG. 1 (three).

Figure 2:
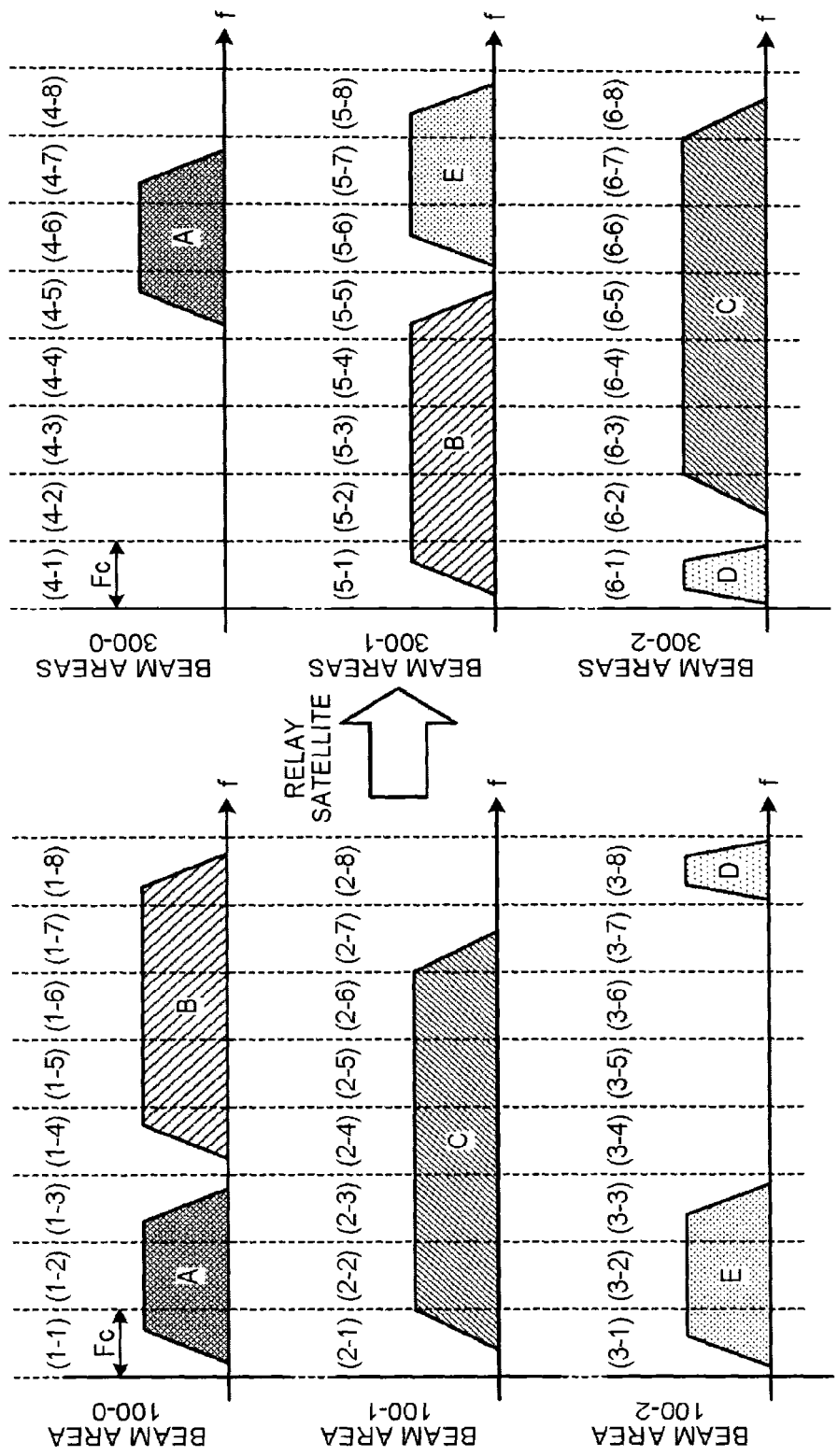
FIG. 2 is a diagram showing a flow of a relay signal by relay processing of a relay satellite in the first embodiment.

The operation of relay processing of the relay satellite 10 including the relay apparatus in this embodiment is explained. FIG. 2 is a diagram showing a flow of a relay signal by the relay processing of the relay satellite in this embodiment. The relay satellite 10, which is the relay apparatus, relays uplink signals from the beam areas 100-0, 100-1, and 100-2 shown in FIG. 2(*a*) to the beam areas 300-0, 300-1, and 300-2 shown in FIG. 2(*b*) as downlink signals. That is, the relay satellite 10 outputs the uplink signals from the beam areas as the downlink signals while allocating the uplink signals to desired beam areas and converting the uplink signals into desired frequencies.

Specifically, the relay satellite 10 rearranges frequencies as shown in FIG. 2 and relays an uplink signal A from the beam area 100-0 to the beam area 300-0, relays an uplink signal B from the beam area 100-0 to the beam area 300-1, relays an uplink signal C from the beam area 1300-1 to the beam area 300-2, relays an uplink signal D from the beam area 100-2 to the beam area 300-2, and relays an uplink signal E from the beam area 100-2 to the beam area 300-1. Note that the number of demultiplexed data and the number of data before multiplexing are m=8. Bandwidth of each of the demultiplexed signals is Fc.

After receiving signals A and B from the beam area 100-0 shown in FIG. 2(*a*) with the reception antenna 11-0, the relay satellite 10 converts the signals A and B from a radio frequency band into a baseband through the down-converter 12-0 and the RXF 13-0. The A/D converter 14-0 samples the signals A and B converted into the baseband. The demultiplexing unit 15-0 digitally demultiplexes the signal A after the sampling into bands (1-1) to (1-3) and digitally demultiplexes the signal B after the sampling into bands (1-4) to (1-8) among eight bands ((1-1) to (1-8)) shown in FIG. 2(*a*). Note that systems of the digital demultiplexing and digital multiplexing explained below are not particularly limited. Conventional systems, for example, systems described in any one of two documents described below can be used.

Yamashita et al., "Proposal and Basic Operation Characteristics of a Variable Band FFT Filter Bank for Satellite Mounting" The Institute of Electronics, Information and Communication Engineers Technical Research Report. SAT, Satellite Communication 100 (484), 37 to 42, 2000-12-01.

Fujimura et al., "A Study of Digital Demultiplexer/Multiplexer for Flexible Regenerative Transponders" 2011, The Institute of Electronics, Information and Communication Engineers Communication Society Conference B-3-10.

In the relay satellite 10, the demultiplexing unit 15-0 demultiplexes the signal A into three and demultiplexes the signal B into five through any one of the kinds of demultiplexing processing explained above.

After applying digital amplitude/phase control to the signal A demultiplexed into three with the RX compensating unit 16-0, the relay satellite 10 inputs the signal A to the TX compensating unit 18-0 through the switch matrix 17. In that case, the switch matrix 17 connects the signal A demultiplexed into three to bands (4-5) to (4-7). That is, the relay satellite 10 outputs the signal A to frequency positions (the bands (4-5) to (4-7)) shown in FIG. 2(*b*) from the transmission antenna 23-0 through the TX compensating unit 18-0, the multiplexing unit 19-0, the D/A converter 20-0, the TXF 21-0, and the up-converter 22-0.

After applying digital amplitude/phase control to the signal B demultiplexed into five with the RX compensating unit 16-0, the relay satellite 10 inputs the signal B to the TX compensating unit 18-0 through the switch matrix 17. In that case, the switch matrix 17 connects the signal B demultiplexed into five to bands (5-1) to (5-5). That is, the relay satellite 10 outputs the signal B to frequency positions (the bands (5-1) to (5-5)) shown in FIG. 2(*b*) from the transmission antenna 23-1 through the TX compensating unit 18-1, the multiplexing unit 19-1, the D/A converter 20-1, the TXF 21-1, and the up-converter 22-1.

Similarly, after receiving a signal C from the beam area 100-1 shown in FIG. 2(*a*) with the reception antenna 11-1, the relay satellite 10 converts the signal C from a radio frequency band to a baseband through the down-converter 12-1 and the RXF 13-1. The A/D converter 14-1 samples the signal C converted into the baseband. The demultiplexing unit 15-1 digitally demultiplexes the signal C after the sampling into bands (2-1) to (2-7) among eight bands ((2-1) to (2-8)) shown in FIG. 2(*a*).

After applying digital amplitude/phase control to the signal C demultiplexed into seven with the RX compensating unit 16-1, the relay satellite 10 inputs the signal C to the TX compensating unit 18-2 through the switch matrix 17. In that case, the switch matrix 17 connects the signal C demultiplexed into seven to bands (6-2) to (6-8). That is, the relay satellite 10 outputs the signal C to frequency positions (the bands (6-2) to (6-8)) shown in FIG. 2(*b*) from the transmission antenna 23-2 through the TX compensating unit 18-2, the multiplexing unit 19-2, the D/A converter 20-2, the TXF 21-2, and the up-converter 22-2.

After receiving signals E and D from the beam area 100-2 shown in FIG. 2(*a*) with the reception antenna 11-2, the relay satellite 10 converts the signals E and D from a radio frequency band to a baseband through the down-converter 12-2 and the RXF 13-2. The A/D converter 14-2 samples the signals E and D converted into the baseband. The demultiplexing unit 15-2 digitally demultiplexes the signals E and E after the sampling into bands (3-1) to (3-3) among eight bands ((3-1) to (3-8)) shown in FIG. 2(a).

After applying digital amplitude/phase control to the signal E demultiplexed into three with the RX compensating unit 16-2, the relay satellite 10 inputs the signal E to the TX compensating unit 18-1 through the switch matrix 17. In that case, the switch matrix 17 connects the signal E demultiplexed into three to bands (5-6) to (5-8). That is, the relay satellite 10 outputs the signal E to frequency positions (the bands (5-6) to (5-8)) shown in FIG. 2(b) from the transmission antenna 23-1 through the TX compensating unit 18-1, the multiplexing unit 19-1, the D/A converter 20-1, the TXF 21-1, and the up-converter 22-1.

Note that the relay satellite 10 does not demultiplex the signal D and performs only extraction for the signal D because a bandwidth is smaller than the bandwidth Fc. After applying digital amplitude/phase control to the signal D in the band (3-8) with the RX compensating unit 16-2, the relay satellite 10 inputs the signal D to the TX compensating unit 18-2 through the switch matrix 17. In that case, the switch matrix 17 connects the signal D to band (6-1). That is, the relay satellite 10 outputs the signal D to a frequency position (the band (6-1)) shown in FIG. 2(b) from the transmission antenna 23-2 through the TX compensating unit 18-2, the multiplexing unit 19-2, the D/A converter 20-2, the TXF 21-2, and the up-converter 22-2.

Note that connection control of the switch matrix 17 is performed by the control station 200 shown in FIG. 1. The control station 200 collectively manages connection and frequency bands in use of all satellite lines. The control station 200 performs, according to a communication request, the connection control of the switch matrix 17 in the relay satellite 10 through another radio frequency line.

Necessity of compensation in the RX compensating unit 16-n and the TX compensating unit 18-n, which is a characteristic operation in this embodiment, is explained.

Figure 3:
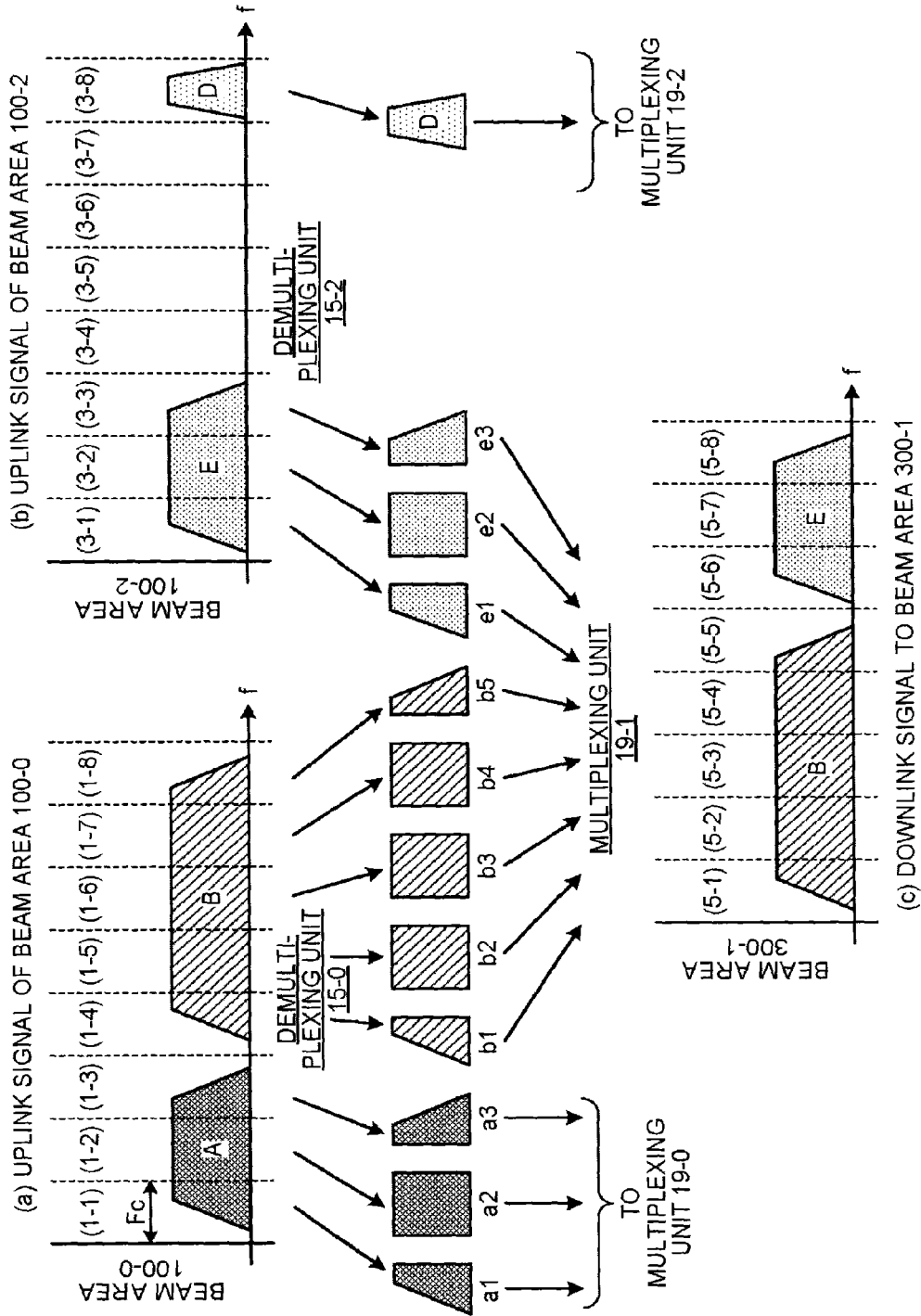
FIG. 3 is a diagram showing a flow of signal relay processing performed when frequency-to-amplitude/phase characteristics of an RXF and a TXF are ideal.

First, an operation performed when frequency-to-amplitude/phase characteristics of the RXF 13-n and the TXF 21-n, that is, when there is no in-band amplitude deviation and group delay deviation is explained. FIG. 3 is a diagram showing a flow of signal relay processing from the beam areas 100-0 and 100-2 to the beam area 300-1 in the relay satellite 10 in this embodiment performed when the frequency-to-amplitude/phase characteristics of the RXF 13-n and the TXF 21-n are ideal. Note that, FIG. 3 explains a case in which the frequency-to-amplitude/phase characteristics of the RXF 13-n and the TXF 21-n are ideal (there is no in-band amplitude deviation and group delay deviation), the RX compensating unit 16-n and the TX compensating unit 18-n are not operated, and an input signal is output as it is.

In FIG. 3, a series of signal processing is shown in which, after demultiplexing the signal B into five sub-channels with the demultiplexing unit 15-0 and after demultiplexing the signal E into three sub-channels with the demultiplexing unit 15-2, the relay satellite 10 collects the signal B and the signal E in the multiplexing unit 19-1 with the switch matrix 17 and multiplexes the signal B and the signal E. As it is evident from FIG. 3, in the relay satellite 10, when the frequency-to-amplitude/phase characteristics of the RXF 13-n and the TXF 21-n are ideal, distortion of signals does not occur in the signals B and E in the uplink even if measures are not particularly applied thereto and the signals B and E can be relayed to the beam area 300-1 in the downlink.

However, in the relay satellite 10, when the frequency-to-amplitude/phase characteristics of the RXF 13-n and the TXF 21-n are not ideal and no measures are taken, that is, when the RX compensating unit 16-n and the TX compensating unit 18-n are not operated and an input signal is output as it is, distortion of signals occurs in the signals B and E of the uplink by the fact that the signals B and E are transmitted via the relay satellite 10.

Figure 4:
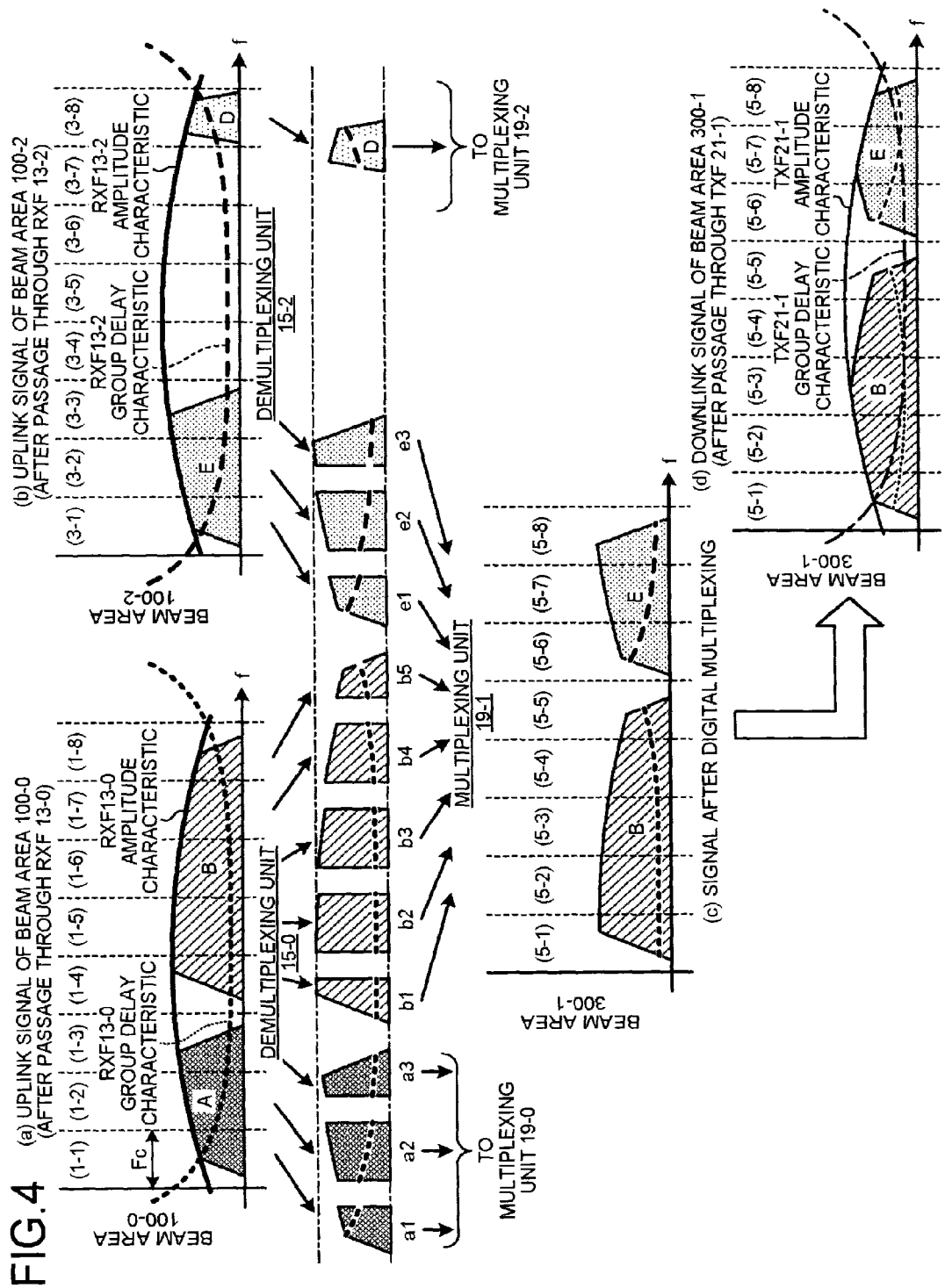
FIG. 4 is a diagram showing a flow of signal relay processing performed when the frequency-to-amplitude/phase characteristics of the RXF and TXF are not ideal and are curved and no measures are taken.

FIG. 4 is a diagram showing a flow of signal relay processing from the beam areas 100-0 and 100-2 to the beam area 300-1 in the relay satellite 10 in this embodiment performed when the frequency-to-amplitude/phase characteristics of the RXF 13-n and the TXF 21-n are not ideal and no measures are taken. A characteristic indicated by a solid line shown in FIG. 4(a) indicates a frequency-to-amplitude characteristic of the RXF 13-0 and a characteristic indicated by a dotted line shown in FIG. 4(a) indicates a frequency-to-group delay characteristic of the RXF 13-0. Similarly, a characteristic indicated by a solid line shown in FIG. 4(b) indicates a frequency-to-amplitude characteristic of the RXF 13-2 and a characteristic indicated by a dotted line shown in FIG. 4(b) indicates a frequency-to-group delay characteristic of the RXF 13-2. A characteristic indicated by a solid line shown in FIG. 4(d) indicates a frequency-to-amplitude characteristic of the TXF 21-1 and a characteristic indicated by a broken line shown in FIG. 4(d) indicates a frequency-to-group delay characteristic of the TXF 21-1.

As it is evident from FIG. 4, in this case, the signals A and B are distorted due to the frequency-to-amplitude characteristic of the RXF 13-0 (FIG. 4(a)). The signals E and D are also distorted due to the frequency-to-amplitude characteristic of the RXF 13-2 (FIG. 4(b)). Consequently, it is seen that the frequency-to-amplitude characteristics (spectra) of the signals B and E after the digital multiplexing multiplexed by the multiplexing unit 19-1 are distorted as shown in FIG. 4(c). In-band group delay characteristics of the signals B and E are not fixed and gradients occur in bands as indicated by dotted lines in signal spectra shown in FIG. 4(c).

Further, in the relay satellite 10, the frequency-to-amplitude characteristic (a solid line) of the TXF 21-n shown in FIG. 4(d) is added during the signal transmission. Therefore, the distortion of the frequency-to-amplitude characteristics (spectra) of the signals B and E output from the relay satellite 10 to the beam area 300-1 is increased as shown in FIG. 4(d). In-band group delay deviations of the signals are also added anew as a characteristic indicated by a broken line shown in FIG. 4(d), so that an overall in-band group delay deviation tends to increase.

As explained above, in the relay satellite 10, every time a signal passes through the analog filters, the deviation of the frequency-to-amplitude characteristics (spectra) of the signals increases and the in-band group delay deviations of the signals also increase. Therefore, in this embodiment, the RX compensating unit 16-n and the TX compensating unit 18-n perform operations for compensating for characteristics of the analog filters.

Figure 5:
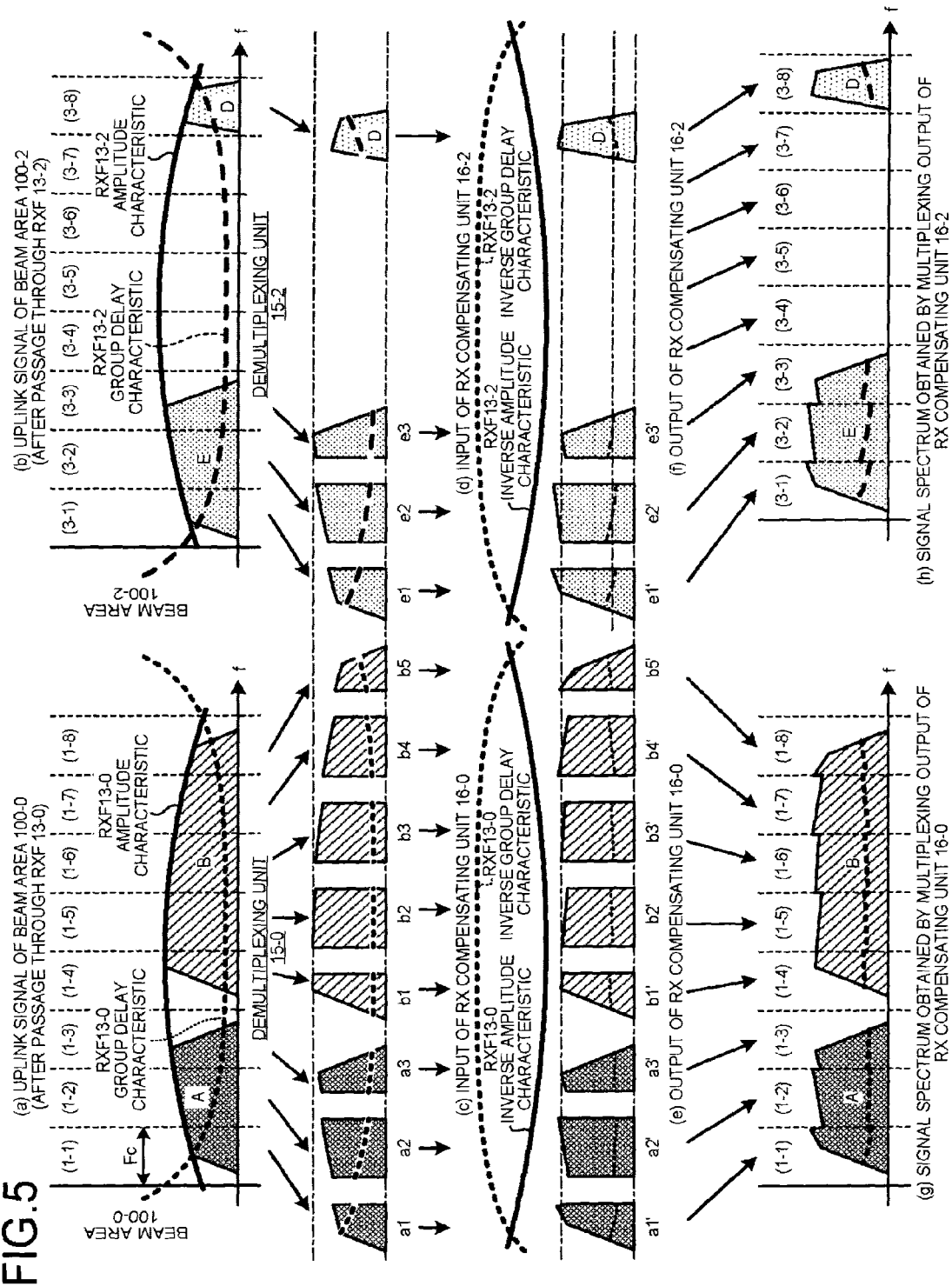
FIG. 5 is a diagram showing a flow of signal relay processing performed when an RX compensating unit is operated.

FIG. 5 is a diagram showing a flow of signal relay processing from the beam areas 100-0 and 100-2 to the beam area 300-1 in the relay satellite 10 in this embodiment performed when the RX compensating unit 16-n is operated. The same figure shows a case in which an operation performed when a frequency-to-amplitude characteristic of the RXF 13-n is not ideal and is curved and the RX compensating unit 16-n is operated.

Figure 6:
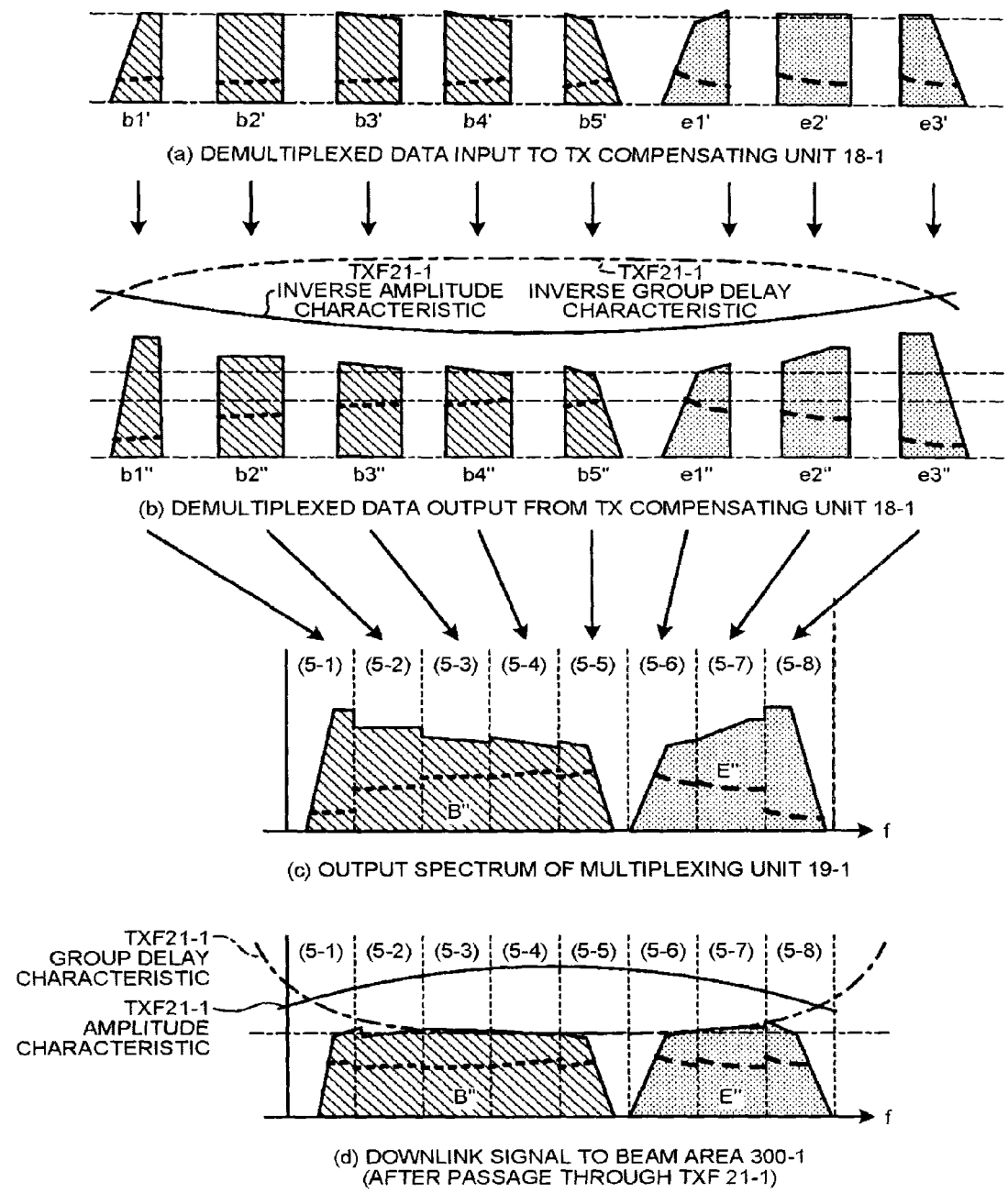
FIG. 6 is a diagram showing a flow of signal relay processing performed when a TX compensating unit is operated.

FIG. 6 is a diagram of a flow of signal relay processing from the beam areas 100-0 and 100-2 to the beam area 300-1 in the relay satellite 10 in this embodiment performed when the TX compensating unit 18-n is operated. The same figure shows a case in which an operation performed when a frequency-to-amplitude characteristic of the TXF 21-n is not ideal and is curved and the TX compensating unit 18-*n* is operated when a signal compensated in FIG. 5 is transmitted.

Figure 15:
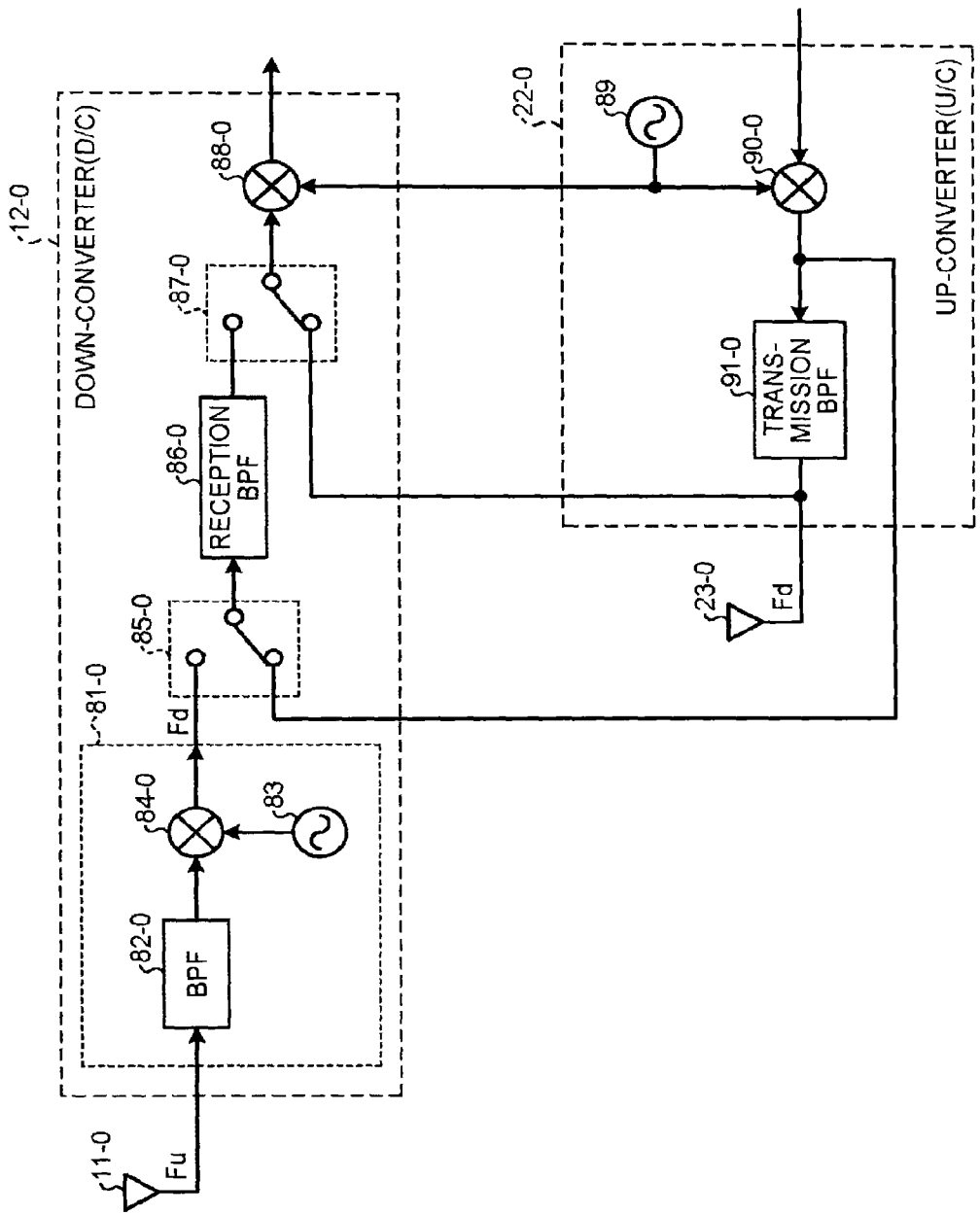
FIG. 15 is a diagram showing a configuration example of a relay satellite that automatically compensates for characteristics of an up-converter and a down-converter in a sixth embodiment.

First, an operation example performed when the frequency-to-amplitude characteristic of the RXF 13-*n* is not ideal and is curved and the RX compensating unit 16-*n* is operated is explained with reference to FIG. 5. In the relay satellite 10, the signals A and B (FIG. 5(*a*)) affected by an analog characteristic of the RXF 13-0 are demultiplexed into eight sub-channels by the demultiplexing unit 15-0 as shown in FIG. 5(*c*) and input to the RX compensating unit 16-0. Similarly, in the relay satellite 10, the signals E and D (FIG. 5(*b*)) affected by an analog characteristic of the RXF 13-2 are demultiplexed into four sub-channels by the demultiplexing unit 15-2 as shown in FIG. 15(*d*) and input to the RX compensating unit 16-2.

The RX compensating unit 16-*n* has a complex coefficient $W_R(m, n)$ having a frequency characteristic opposite to a frequency characteristic of the RXF 13-*n* (a reception analog filter) at the pre-stage. The RX compensating unit 16-*n* applies, to the sub-channels, compensation for cancelling a gradient and a ripple of a frequency-to-amplitude/group delay characteristic of the RXF 13-*n* at the pre-stage using this coefficient. Note that m indicates a demultiplexing/multiplexing number and n indicates a port number. In this embodiment, n is any one of 0, 1, and 2.

In FIG. 5(*e*), an amplitude characteristic (=an inverse amplitude characteristic) for cancelling a gradient and a ripple of an amplitude characteristic of the RXF 13-0 at the pre-stage is indicated by a solid line. A group delay characteristic (=an inverse group delay characteristic) for cancelling a group delay deviation of the RXF 13-0 at the pre-stage is indicated by a dotted line. Similarly, in FIG. 5(*f*), an amplitude characteristic (=an inverse amplitude characteristic) for cancelling a gradient and a ripple of an amplitude characteristic of the RXF 13-2 at the pre-stage is indicated by a solid line. A group delay characteristic (=an inverse group delay characteristic) for cancelling a group delay deviation of the RXF 13-2 at the pre-stage is indicated by a dotted line.

In FIG. 5(*e*), demultiplexed signals after compensation by the RX compensating unit 16-0 are shown. In FIG. 5(*f*), demultiplexed signals after compensation by the RX compensating unit 16-2 are shown. As it is seen from the figures, variations of the amplitude and group delay characteristics of the input signals shown in FIG. 5(*c*) and FIG. 5(*d*) are aligned in a unit of the bandwidth Fc after the compensation.

A signal spectrum obtained by digitally multiplexing the demultiplexed signals after the compensation is as shown in FIG. 5(*g*) and FIG. 5(*h*). When compared with a spectrum obtained when the compensation is not performed shown in FIG. 5(*a*) and FIG. 5(*b*), it is seen that an amplitude gradient and a group delay deviation are improved.

Specific calculation content of the RX compensating unit 16-*n* is explained below. When a baseband signal input to the RX compensating unit 16-*n* is represented as S(m, n) and a baseband signal compensated by the RX compensating unit 16-*n* is represented as S'(m, n), the RX compensating unit 16-*n* performs a complex multiplication indicated by the following Formula (1) using the complex coefficient $W_R(m, n)$. The RX compensating unit 16-*n* performs compensation of not only amplitude but also a phase of the signal S(m, n) to compensate for a group delay deviation as well.

$$S'(m,n) = S(m,n) * W_R(m,n) \quad (1)$$

Specifically, the complex multiplication can be realized by four multiplications and two additions as indicated by the following Formulas (2) and (3). Note that Re[*] indicates a real number part of * and Im[*] indicates an imaginary number part of *.

$$Re[S'(m,n)] = Re[S(m,n)] * Re[W_R(m,n)] - Im[S(m,n)] * Im[W_R(m,n)] \quad (2)$$

$$Im[S'(m,n)] = Re[S(m,n)] * Im[W_R(m,n)] + Im[S(m,n)] * Re[W_R(m,n)] \quad (3)$$

Sampling speed of data after demultiplexing is curtailed by 1/m time (↓m) with respect to sampling speed before the demultiplexing. Therefore, these calculations can be subjected to time division processing at m=8. In this case, the number of multipliers necessary in the n-th RX compensating unit 16-*n* only has to be four and the number of adders necessary in the n-th RX compensating unit 16-*n* only has to be two. Therefore, necessary numbers of multipliers and adders can be reduced to 1/m.

When it is desired to further reduce the circuit size, although the group delay deviation cannot be compensated, the signals can be compensated by a real number type coefficient $G_R(m, n)$ indicated by the following Formulas (4) and (5).

$$Re[S'(m,n)] = Re[S(m,n)] * G_R(m,n) \quad (4)$$

$$Im[S'(m,n)] = Im[S(m,n)] * G_R(m,n) \quad (5)$$

In this case, only the frequency-to-amplitude characteristic of the RXF 13-*n* is compensated. However, the number of multipliers and the number of adders necessary in the n-th RX compensating unit 16-*n* only have to be two and zero after the time division processing is applied.

An operation example performed when the frequency-to-amplitude characteristic of the TXF 21-*n* is not ideal and is curved and the TX compensating unit 18-*n* is operated is explained with reference to FIG. 6. FIG. 6 shows processing of the TX compensating unit 18-1 performed when the relay satellite 10 transmits the signal B (actually, demultiplexed into five sub-channels of signals b1', b2', b3', b4', and b5') compensated by the RX compensating unit 16-0 shown in FIG. 5 and the signal E (actually, demultiplexed into three sub-channels of signals e1', e2', and e3') compensated by the RX compensating unit 16-2 to the beam area 300-1.

In FIG. 6(*a*), the signal B (the signals b1', b2', b3', b4', and b5') and the signal E (the signals e1', e2', and e3') input to the TX compensating unit 18-1 are shown.

The TX compensating unit 18-*n* has a complex coefficient $W_T(m, n)$ having a frequency characteristic opposite to the frequency characteristic of the TXF 21-*n* (a transmission analog filter) at the post stage. The TX compensating unit 18-*n* applies, to the sub-channels, compensation for cancelling a gradient and a ripple of the frequency-to-amplitude/group delay characteristic of the RXF 13-*n* at the post stage using this coefficient. As explained above, m indicates a demultiplexing/multiplexing number, n indicates port numbers, and n is any one of 0, 1, and 2.

In FIG. 6(*b*), an amplitude characteristic (=an inverse amplitude characteristic) for cancelling a gradient and a ripple of an amplitude characteristic of the TXF 21-1 at the post stage is indicated by a solid line and a group delay characteristic (=an inverse group delay characteristic) for cancelling a group delay deviation of the TXF 21-1 at the post stage is indicated by a dotted line.

In FIG. 6(*b*), demultiplexed signals after compensation by the TX compensating unit 18-1 are shown. As it is evident from FIG. 6(*b*), the TX compensating unit 18-1 amplifies the amplitude of a demultiplexed signal on the outer side to cancel a frequency characteristic of the TXF 21-1 at the post stage in advance and controls a phase to also cancel a group delay.

A specific calculation content of the TX compensating unit 18-*n* is explained below. When a baseband signal input to the TX compensating unit 18-*n* is represented as S'(m, n) and a baseband signal compensated by the TX compensating unit 18-*n* is represented as S"(m, n), the TX compensating unit 18-*n* performs a complex multiplication indicated by the following Formula (6) using the complex coefficient $W_T$(m, n).

$$S''(m,n)=S'(m,n)*W_T(m,n) \quad (6)$$

Specifically, the complex multiplication can be realized by four multiplications and two additions as indicated by the following Formulas (7) and (8). As explained above, Re[*] is a real number part of * and Im[*] is an imaginary number part of *.

$$Re[S''(m,n)]Re[S'(m,n)]*Re[W_T(m,n)]-Im[S'(m,n)]*Im[W_T(m,n)] \quad (7)$$

$$Im[S''(m,n)]=Re[S'(m,n)]*Im[W_T(m,n)]+Im[S'(m,n)]*Re[W_T(m,n)] \quad (8)$$

Sampling speed of data after demultiplexing is curtailed by 1/m time (↓m) with respect to sampling speed before the demultiplexing. Therefore, as in the RX compensating unit 16-*n*, these calculations can be subjected to time division processing at m=8. In this case, the number of multipliers necessary in the n-th TX compensating unit 18-*n* only has to be four and the number of adders necessary in the n-th TX compensating unit 18-*n* only has to be two. Therefore, necessary numbers of multipliers and adders can be reduced to 1/m.

When it is desired to further reduce the circuit size, although the group delay deviation cannot be compensated, the signals can be compensated by a real number type coefficient $G_T$(m, n) indicated by the following Formulas (9) and (10).

$$Re[S'(m,n)]=Re[S(m,n)]*G_T(m,n) \quad (9)$$

$$Im[S'(m,n)]=Im[S(m,n)]*G_T(m,n) \quad (10)$$

In this case, only the frequency-to-amplitude characteristic of the TXF 21-*n* is compensated. However, the number of multipliers and the number of adders necessary in the n-th TX compensating unit 18-*n* only has to be two and zero after the time division processing is applied.

Note that the coefficients ($W_R$(m, n) and $W_T$(m, n) or $G_R$(m, n) and $G_T$(m, n)) on TX compensation side can be stored inside the relay satellite 10. In general, characteristics of an analog filter change according to aged deterioration and temperature. Therefore, the coefficients can be rewritable.

For example, an optimum coefficient sequence can be calculated for each temperature before the launch of the relay satellite 10, stored in a not-shown memory (storing means) such as a ROM table in the relay satellite 10, and, after the launch, read out from the memory on the basis of temperature information so as to update the coefficients (($W_R$(m, n) and $W_T$(m, n), or $G_R$(m, n) and $G_T$(m, n)).

Alternatively, the coefficient W(m, n) or G(m, n) can be set rewritable from the ground even after the launch of the relay satellite 10 by transmitting the coefficients (($W_R$(m, n) and $W_T$(m, n) or $G_R$(m, n) and $G_T$(m, n)) from the control station 200 on the ground to the relay satellite 10 through another radio frequency line.

In the relay satellite 10, after the compensation of the TX compensating unit 18-1, the multiplexing unit 19-1 multiplexes demultiplexed signals output from the TX compensating unit 18-*n* and outputs a signal B" and a signal E" shown in FIG. 6(*c*). As shown in FIG. 6(*c*), the signals B" and E" are made signals to which amplitude gradient and group delay deviations have been intentionally added such that the signals are cancelled by the TXF 21-*n* at the post stage. In the relay satellite 10, a signal after multiplexing by the multiplexing unit 19-1 is input to the TXF 21-1 via the D/A converter 20-1. In FIG. 6(*d*), a solid line indicates the frequency-to-amplitude characteristic of the TXF 21-1 and a dotted line indicates the frequency-to-group delay characteristic of the TXF 21-1.

In this way, in the signal B" and the signal E" output from the TXF 21-1, the amplitude gradient and the group delay deviation intentionally added by the TX compensating unit 18-1 at the pre-stage are cancelled by a frequency-to-amplitude/group delay deviation characteristic of the TXF 21-1. As shown in FIG. 6(*d*), the relay satellite 10 outputs the signal B" and the signal E" from the antenna 23-1 after an amplitude characteristic and a group delay deviation characteristic are planarized at a bandwidth Fc step.

As it is evident when compared with the output signal spectra (FIG. 4(*d*)) obtained when RX compensation and TX compensation are not performed, it is seen that, by performing the RX compensation and the TX compensation, signal distortions of the signal B and the signal E that occur inside the relay satellite 10 can be considerably improved.

Note that, in the above explanation, the frequency characteristics of the analog filters are curved. However, not only this, but the compensation can be performed the same when the amplitude characteristic and the group delay characteristic are rippled (uneven).

In this embodiment, a series of processing for the signals B and E relayed to the beam area 300-1 among the uplink signals A, B, E, and D from the beam area 100-0 to the beam area 100-2 is explained. However, this is an example. Processing for signals is not limited to this. In the relay satellite 10, similarly, the signal C received from the beam area 100-1 is compensated by the RX compensating unit 16-1 to be relayed, the signal C to be transmitted to the beam area 300-0 is inversely compensated by the TX compensating unit 18-0 to be relayed, and the signals D and C to be transmitted to the beam area 300-2 are inversely compensated to be relayed.

Consequently, in the relay satellite 10, for example, even when the frequency-to-amplitude/group delay characteristics of the RXF 13-*n* and the TXF 21-*n* are not flat and inclined or are rippled (uneven), signals with less signal distortion can be relayed.

Note that, in the explanation in this embodiment, the demultiplexing/multiplexing number is m=8. However, the demultiplexing/multiplexing number is not limited to m=8 and can be any number equal to or larger than 2. In particular, when the demultiplexing/multiplexing number m is increased, although the circuit sizes of the demultiplexing unit 15-*n* and the multiplexing unit 19-*n* increase, the signal band Fc after the demultiplexing for determining frequency resolution decreases. Therefore, it is possible to finely compensate for signal distortion in a frequency direction.

In the above explanation, the number of ports is three (n=0, 1, and 2). However, the number of ports is not limited to this and can be any number equal to or larger than one.

In the above explanation, as the configuration of the relay satellite 10, the analog filters (the RXF 13-*n* and the TXF 21-*n*) are provided one each on the reception side and the transmission side. However, the analog filters do not need to be provided one each on the transmission and reception sides and a plurality of the analog filters can be provided on each of the transmission and reception sides. In this case, the coefficients of the RX compensation and the TX compensation only have to be set to compensate for a total frequency characteristic and the like of a plurality of analog filters.

As explained above, according to this embodiment, the relay apparatus digitally compensates for the characteristics of the analog filters on the reception side (the demultiplexing apparatus) and the transmission side (the multiplexing apparatus). Consequently, it is made possible to compensate for, without increasing the circuit size, with a slight circuit addition, the amplitude gradient, the ripple, and the group delay deviation of the reception-side analog filter, and the amplitude gradient, the ripple, and the group delay deviation of the transmission side analog filter to be flat even if a part of the gradients is strong.

By implementing this digital compensation function, required specifications of the reception analog filter and the transmission analog filter can be relaxed. Therefore, it is made possible to realize a reduction in the circuit sizes and adjustment places of the reception analog filter and the transmission analog filter. This is considered to lead to a reduction in costs of the relay apparatus because this results in a reduction in development costs of the reception analog filter and the transmission analog filter of the relay apparatus and a reduction in adjustment workloads.

Note that, in this embodiment, the error of the analog filter of the relay apparatus is compensated. However, the embodiment is not always limited to the relay apparatus and can also be applied to a reception station and a transmission station on the ground. For example, when the embodiment is applied to the receiving state on the ground, in the reception station, the switch matrix 17 selects and collects only sub-channels necessary for demodulation out of sub-channel signals compensated by the RX compensating unit 16-$n$ as explained above and the multiplexing unit 19-$n$ multiplexes the sub-channels. Then, a reception signal in which an error that occurs in the RXF 13-$n$ is compensated can be obtained. Consequently, the reception station on the ground can obtain a satisfactory reception characteristic (bit error rate characteristic) by demodulating the compensated signal.

Similarly, when the embodiment is applied to the transmission station on the ground, in the transmission station, after the demultiplexing unit 15-$n$ once demultiplexes a modulation target signal into sub-channel units, as explained above, the TX compensating unit 18-$n$ applies the compensation for cancelling an analog error that occurs in the TXF 21-$n$ at the post stage and the multiplexing unit 19-$n$ multiplexes the sub-channels. Then a transmission signal in which the error that has occurred in the TXF 21-$n$ has been compensated can be output. Consequently, the reception station on the transmission partner side can obtain a satisfactory reception characteristic (bit error rate characteristic) by demodulating the compensated signal.

Second Embodiment

In the first embodiment, if the signal band Fc after the demultiplexing is sufficiently reduced (if m is sufficiently increased) by the series of processing, satisfactory compensation of the analog filter characteristic can be realized. However, if the demultiplexing/multiplexing number m is increased, the circuit size also increases, leading to an increase in power consumption and costs.

In the RX-compensated signal shown in FIG. 5($g$) and FIG. 5($h$) and the TX-compensated signal shown in FIG. 6($d$), the demultiplexing/multiplexing number is as small as m=8. Therefore, the circuit size is suppressed. However, when m is reduced, frequency resolution becomes rough. Therefore, a signal band is not considered to be completely smoothed as shown in the figures. Variation (unevenness) slightly remains in an amplitude characteristic and a group delay characteristic.

In particular, in an amplitude deviation and a group delay deviation with large gradients that occur at an end of a pass band, when m is small (the frequency resolution is rough), variation (unevenness) of an amplitude characteristic and a group delay characteristic remaining in a signal band increases, leading to deterioration in relay performance.

Therefore, in this embodiment, for example, the demultiplexing/multiplexing number m is kept at 8. As in the first embodiment, after carrying out the compensation up to the RX compensation, only the sub-channels that should be compensated at finer frequency resolution are compensated after being demultiplexed into k by a demultiplexing unit added anew. Differences from the first embodiment are explained.

Figure 7:
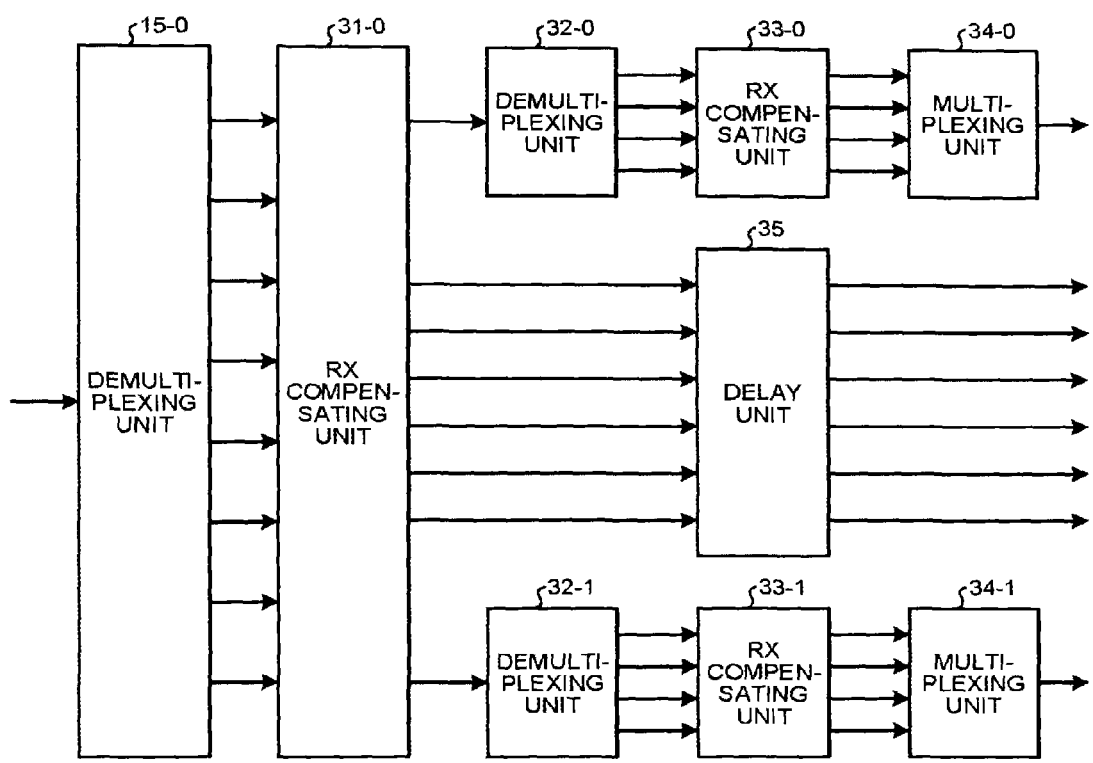
FIG. 7 is a diagram showing a configuration example of an RX compensating unit in a second embodiment.

First, the configuration on a reception side (a demultiplexing apparatus) is explained. FIG. 7 is a diagram showing a configuration example of a reception-side compensating (RX compensating) unit of a relay satellite in this embodiment. The configuration between the demultiplexing unit 15-0 and the switch matrix 17 is shown. The relay satellite 10 includes, instead of the RX compensating unit 16-0, a reception-side compensating (RX compensating) unit 31-0, demultiplexing units 32-0 and 32-1, reception-side compensating (RX compensating) units 33-0 and 33-1, multiplexing units 34-0 and 34-1, and a delay unit 35. The configuration of a reception-side analog compensating unit in which demultiplexing units and multiplexing units are configured in multiple stages is shown. Note that the configuration is the same between the demultiplexing units 15-1 and 15-2 and the switch matrix 17.

The RX compensating unit 31-0 performs RX compensation same as the RX compensation in the first embodiment. The RX compensating unit 31-0 outputs signals of sub-channels, analog compensation for which is insufficient because the frequency resolution Fc is rough, to the demultiplexing units 32-0 and 32-1 at a post stage. The demultiplexing units 32-0 and 32-1 demultiplex the input signals of the sub-channels into k. The RX compensating units 33-0 and 33-1 respectively apply the RS compensation same as the RX compensation in the first embodiment to the signals of the sub-channels input from the demultiplexing units 32-0 and 32-1. The multiplexing units 34-0 and 34-1 respectively multiplex the signals of the sub-channels RX-compensated by the RX compensating units 33-0 and 33-1. The delay unit 35 delays signals of sub-channels transmitted not through the demultiplexing units 32-0 and 32-1, the RX compensating units 33-0 and 33-1, and the multiplexing units 34-0 and 34-1.

As it is evident from FIG. 7, in the configuration shown in the figure, a demultiplexing number of the demultiplexing unit 15-0 at the first stage is m=8, a demultiplexing number of the demultiplexing units 32-0 and 32-1 at the next stage is k=4, which shows the case in which the number of sub-channels that should be compensated at finer frequency resolution is 2.

In the relay satellite 10, for example, analog compensation of two sub-channels among eight sub-channels output from the RX compensating unit 31-0 is insufficient because the frequency resolution Fc is rough, signals of the two sub-channels are further output to the demultiplexing units 32-0 and 32-1. The demultiplexing units 32-0 and 32-1 respectively demultiplex the input signals of the sub-channels into four. The RX compensating units 33-0 and 33-1 apply compensation of amplitude/group delay to the demultiplexed respective waves (signals). The multiplexing units 34-0 and 34-1 multiplex the signals after the amplitude/group delay compensation. Note that the delay unit 35 delays six sub-carriers, which do not need to be compensated at finer frequency resolution, such that a time difference does not occur between the six sub-carriers and the two sub-carriers compensated at the finer frequency resolution.

In the relay satellite 10, according to this series of processing, the two sub-channels, which should be compensated at the frequency resolution finer than the frequency resolution Fc, can be compensated at frequency resolution of Fc/4.

That is, in the relay satellite 10, it is possible to suppress an increase in a circuit size of the demultiplexing unit and the multiplexing unit and a circuit size of the switch unit compared with when the demultiplexing/multiplexing number m is simply increased to improve the frequency resolution by further compensating, at the resolution of the signal band width Fc/k, only a part of bands in which resolution is insufficient at the signal band width Fc equivalent to the frequency resolution.

For example, when the demultiplexing/multiplexing number m is increased to meet resolution (Fc/4) same as the resolution shown in FIG. 7, m needs to be increased from 8 to 32. In this case, the circuit sizes of the demultiplexing units 15-0 to 15-2, the multiplexing units 19-0 to 19-2, and the switch matrix 17 increase to a quadruple or more compared with the circuit sizes in the case of m=8.

On the other hand, when the demultiplexing units and the multiplexing units are configured in the multiple stages as shown in FIG. 7, circuit sizes to be added are approximately two sets of four demultiplexings (the demultiplexing units 32-0 and 32-1), RX compensation (the RX compensating units 33-0 and 33-1), and four multiplexings (the multiplexing units 34-0 and 34-1). Because the number of interface signals with the switch matrix 17 does not increase, the circuit size of the switch matrix 17 does not increase. By adopting the configuration shown in FIG. 7 in this way, a circuit increase amount can be estimated as a double or less of the basic configuration shown in FIG. 1. It is possible to suppress an increase in the circuit size to ½ or less compared with when the demultiplexing/multiplexing number m is simply increased to meet the resolution.

Note that, in FIG. 7, the two sub-channels, which are outputs of the RX compensating unit 31-0, are fixedly connected to the demultiplexing units 32-0 and 32-1. However, it is also possible that a switch is additionally provided between the RX compensating unit 31-0 and the demultiplexing units 32-0 and 32-1 and two sub-channels are optionally selected out of the eight sub-channels output from the RX compensating unit 31-0 and supplied to the demultiplexing units 32-0 and 32-1. The two sub-channels compensated at the frequency resolution Fc/4 are switched by the switch matrix 17 at the post stage together with the other sub-channels. In this case, a band to be analogically compensated at the frequency resolution Fc/4 can be freely selected. Therefore, the relay satellite 10 can cope with various cases during signal reception.

Note that, in the explanation referring to FIG. 7, m=8, k=4, and the number of sub-channels that should be compensated at finer frequency resolution is two. However, this is an example and m, k, and the number of the sub-channels are not limited to these numbers.

In the above explanation, the RX compensating unit 16-0 in the first embodiment is replaced. However, for example, the reception-side compensating (RX compensating) unit 31-0 in this embodiment and the RX compensating unit 16-0 in the first embodiment can have the same performance or can have different performances. In the case of the same performance, the demultiplexing units 32-0 and 32-1, the reception-side compensating (RX compensating) units 33-0 and 33-1, the multiplexing units 34-0 and 34-1, and the delay unit 35 can be added to the configuration in the first embodiment.

The configuration on a transmission side (a multiplexing apparatus) is explained. In the relay satellite 10, as on the reception side, the demultiplexing/multiplexing number m can be kept at 8 and, before the TX compensation, only a part of the sub-channels can be inversely compensated at finer frequency resolution in advance.

Figure 8:
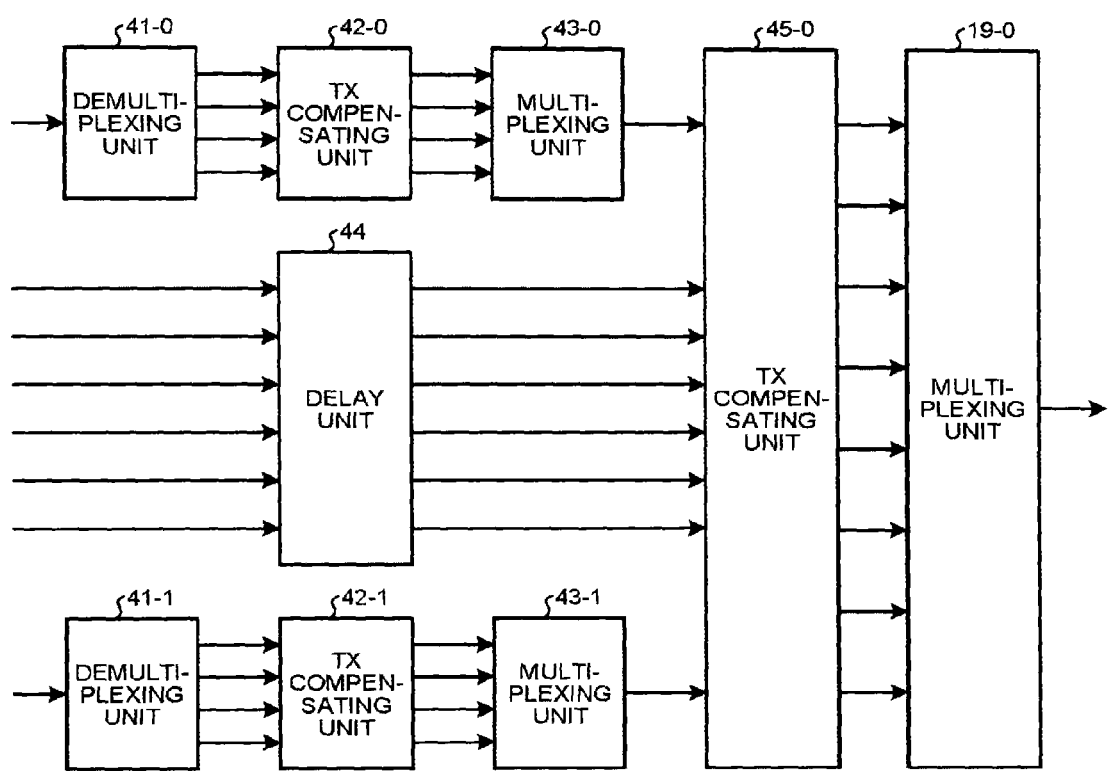
FIG. 8 is a diagram showing a configuration example of a TX compensating unit in the second embodiment.

FIG. 8 is a diagram showing a configuration example of a transmission-side compensating (TX compensating) unit of the relay satellite in this embodiment. The configuration between the switch matrix 17 and the multiplexing unit 19-0 is shown. The relay satellite 10 includes, instead of the TX compensating unit 18-0, demultiplexing units 41-0 and 41-1, transmission-side compensating (TX compensating) units 42-0 and 42-1, multiplexing units 43-0 and 43-1, a delay unit 44, and a transmission-side compensating (TX compensating) unit 45-0. The configuration of a transmission-side analog compensating unit in which demultiplexing units and multiplexing units are configured in multiple stages is shown. Note that the configuration is the same between the switch matrix 17 and the multiplexing units 19-1 and 19-2.

The demultiplexing units 41-0 and 41-1 demultiplex input signals of sub-channels into k. The TX compensating units 42-0 and 42-1 respectively apply TX compensation same as the TX compensation in the first embodiment to the signals of the sub-channels input from the demultiplexing units 41-0 and 41-1. The multiplexing units 43-0 and 43-1 respectively multiplex the signals of the sub-channels after the TX compensation by the TX compensating units 42-0 and 42-1. The delay unit 44 delays signals of sub-channels transmitted not through the demultiplexing units 41-0 and 41-1, the TX compensating units 42-0 and 42-1, and the multiplexing units 43-0 and 43-1. The TX compensating unit 45-0 perform TX compensation same as the TX compensation in the first embodiment.

As it is evident from FIG. 8, in the configuration shown in the figure, a multiplexing number of the multiplexing unit 19-0 at the post stage is m=8, a demultiplexing number of the demultiplexing units 41-0 and 41-1 at the pre-stage is k=4, and the number of sub-channels that should be inversely compensated at finer frequency resolution is 2.

In the relay satellite 10, for example, analog compensation of two sub-channels among eight sub-channels inversely compensated by the TX compensating unit 45-0 is insufficient because the frequency resolution Fc is rough, signals of the two sub-channels are output to the demultiplexing units 41-0 and 41-1 in advance. The demultiplexing units 41-0 and 41-1 respectively demultiplex the input signals of the sub-channels into four. The TX compensating units 42-0 and 42-1 apply inverse compensation of amplitude/group delay to the demultiplexed respective waves (signals). The multiplexing units 43-0 and 43-1 multiplex the signals after the amplitude/group delay inverse compensation. Note that the delay unit 44 delays six sub-carriers, which do not need to be compensated at finer frequency resolution, such that a time difference does not occur between the six sub-carrier and the two sub-carriers inversely compensated at the finer frequency resolution.

In the relay satellite 10, according to this series of processing, the two sub-channels, which should be compensated at the frequency resolution finer than the frequency resolution Fc, can be inversely compensated at frequency resolution of Fc/4.

In this case, as on the reception side shown in FIG. 7, it is made possible to suppress an increase in the circuit size to ½ or less compared with when the demultiplexing/multiplexing number m is simply increased to meet the resolution.

Note that, in FIG. 8, the two sub-channels input to the TX compensating unit 45-0 are fixedly connected to the multiplexing units 43-0 and 43-1. However, it is also possible that sub-channels desired to be inversely compensated at the resolution of Fc/4 is input to the demultiplexing units 41-0 and 41-1 by the switch matrix 17, a switch is additionally provided between the multiplexing units 43-0 and 43-1 and the TX compensating unit 45-0, and the eight sub-channels before being input to the TX compensating unit 45-0 are optionally rearranged and then inversely compensated by the TX compensating unit 45-0. A band to be analogically inversely compensated at the frequency resolution Fc/4 can be freely selected. Therefore, the relay satellite 10 can cope with various cases during signal transmission.

Note that, in the explanation referring to FIG. 8, m=8, k=4, and the number of sub-channels that should be compensated at finer frequency resolution is two. However, this is an example and m, k, and the number of the sub-channels are not limited to these numbers.

In the above explanation, the TX compensating unit 18-0 in the first embodiment is replaced. However, for example, the transmission-side compensating (TX compensating) unit 45-0 in this embodiment and the TX compensating unit 18-0 in the first embodiment can have the same performance or can have different performances. In the case of the same performance, the demultiplexing units 41-0 and 41-1, the transmission-side compensating (TX compensating) units 42-0 and 42-1, the multiplexing units 43-0 and 43-1, and the delay unit 44 can be added to the configuration in the first embodiment.

In the above explanation, concerning the reception side (the demultiplexing apparatus) and the transmission side (the multiplexing apparatus), the number of sub-channels to be finely frequency-resolved (two) and the number of sub-channels obtained by more finely frequency-resolving the sub-channels (four) are the same. However, this is an example. The numbers can be different on the reception side (the demultiplexing apparatus) and the transmission side (the multiplexing apparatus). Note that, on the reception side (the demultiplexing apparatus), the RX compensating unit 16-0 in the first embodiment is replaced with the configurations of the RX compensating unit 31-0 to the delay unit 35. However, the RX compensating unit 31-0 to the delay unit 35 can operate as one RX compensating unit. Similarly, on the transmission side (the multiplexing apparatus), the TX compensating unit 18-0 in the first embodiment is replaced with the configuration of the demultiplexing units 41-0 and 41-1 to the TX compensating unit 45-0. However, the demultiplexing units 41-0 and 41-1 to the TX compensating unit 45-0 can operate as one TX compensating unit.

As explained above, according to this embodiment, among the signals of the sub-channels demultiplexed into in, only the sub-channels that should be compensated at finer frequency are compensated after being demultiplexed into k by the demultiplexing unit added anew. Consequently, it is made possible to perform the compensation at the finer frequency resolution as a whole while suppressing an increase in the circuit size.

Third Embodiment

In the explanation in the first embodiment, the RXF 13-$n$ extracts the baseband signal from the signal after the multiplication and the A/D converter 14-$n$ samples the baseband signal extracted by the RXF 13-$n$.

In the following explanation in this embodiment, the RXF 13-$n$ extracts an intermediate frequency (IF) signal from a signal after multiplication and the A/D converter 14-$n$ samples the intermediate frequency (IF) signal extracted by the RXF 13-$n$. In this case, the demultiplexing unit 15-$n$ only has to perform demultiplexing processing after performing digital quadrature detection of the sampled IF signal and converting the IF signal into a baseband signal.

Figure 9:
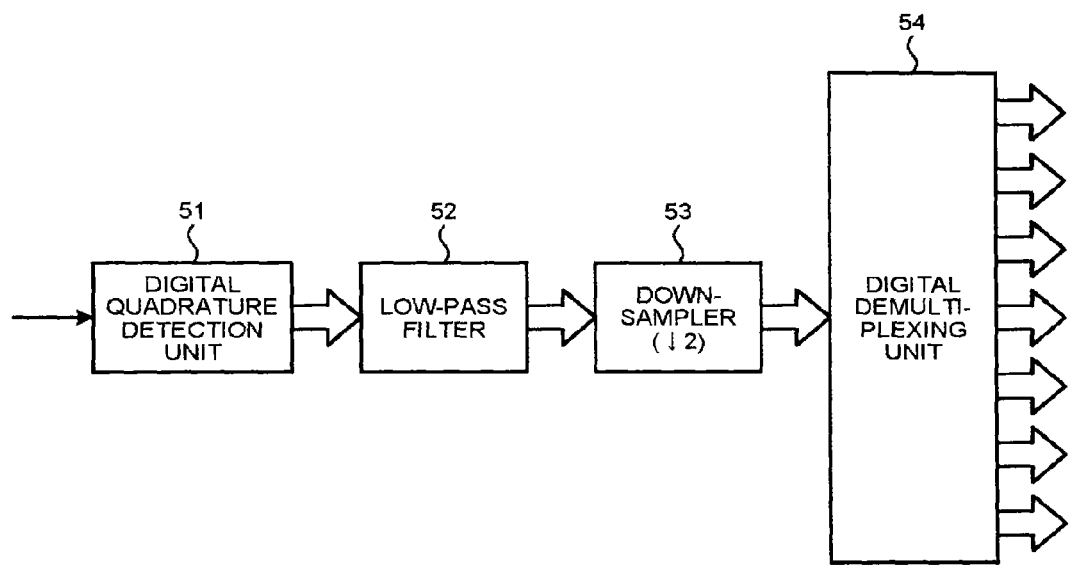
FIG. 9 is a diagram showing a configuration example of a demultiplexing unit in a third embodiment.

FIG. 9 is a diagram showing a configuration example of the demultiplexing unit 15-$n$ of a relay satellite in this embodiment. The demultiplexing unit 15-$n$ includes a digital quadrature detection unit 51, a low-pass filter 52, a down-sampler 53, and a digital demultiplexing unit 54.

The digital quadrature detection unit 51 multiplies a received IF signal with a digital complex local signal having the same frequency. The low-pass filter 52 extracts a baseband component and removes a harmonic component. The down-sampler 53 curtails sampling speed of a baseband signal output from the low-pass filter 52 to ½ and then outputs the baseband signal to the digital demultiplexing unit 54, which is a main function. The digital demultiplexing unit 54 demultiplexes a digital signal input from the down-sampler 53 into m signals.

Similarly, in the explanation in the first embodiment, the multiplexed signal output from the multiplexing unit 19-$n$ is converted into the analog baseband signal by the D/A converter 20-$n$ and thereafter converted from the baseband into the radio frequency band by the up-converter 22-$n$ via the TXF 21-0.

In the following explanation in this embodiment, the multiplexing unit 19-$n$ digitally quadrature-modulates a multiplexed signal into intermediate frequency (IF) data. The D/A converter 20-$n$ converts the intermediate frequency (IF) data into an analog IF signal. Thereafter, the up-converter 22-0 converts the analog IF signal into a radio frequency band via the TXF 21-0.

Figure 10:
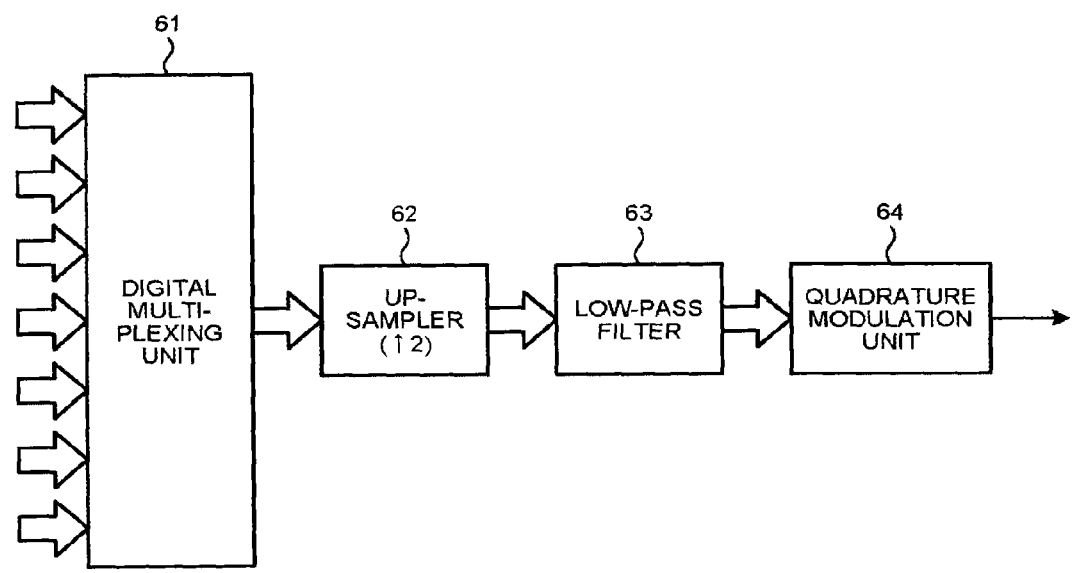
FIG. 10 is a diagram showing a configuration example of a multiplexing unit in the third embodiment.

FIG. 10 is a diagram showing a configuration example of the multiplexing unit 19-$n$ in this embodiment. The multiplexing unit 19-$n$ includes a digital multiplexing unit 61, an up-sampler 62, a low-pass filter 63, and a quadrature modulation unit 64.

The digital multiplexing unit 61 multiplexes input baseband signals into one wave (signal). The up-sampler 62 inserts zero into a baseband data sequence after the multiplexing to increase sampling speed to a double. The low-pass filter 63 removes harmonics generated because the sampling speed is increased to the double by the zero insertion and extracts baseband components. The quadrature modulation unit 64 converts baseband data input from the low-pass filter 63 into IF data.

As explained above, according to this embodiment, the signal to be subjected to the relay processing in the relay satellite are the IF signal. Because an interface between a digital section and an analog section is the IF signal in this way, required sampling speed of the A/D converter 14-$n$ and the D/A converter 20-$n$ increases. However, because the quadrature detection and the quadrature modulation are digitally performed, I and Q amplitude errors and a quadrature error that occur in analog quadrature detection and analog quadrature modulation can be eliminated. Required numbers of the A/D converters, the D/A converters, the RXFs, and the TXFs can be respectively reduced from two to one.

Fourth Embodiment

In this embodiment, besides compensation of analog filter characteristics (RXF and TXF) of the relay satellite 10, characteristics of a transmission filter and a reception filter of a ground station are compensated.

Figure 11:
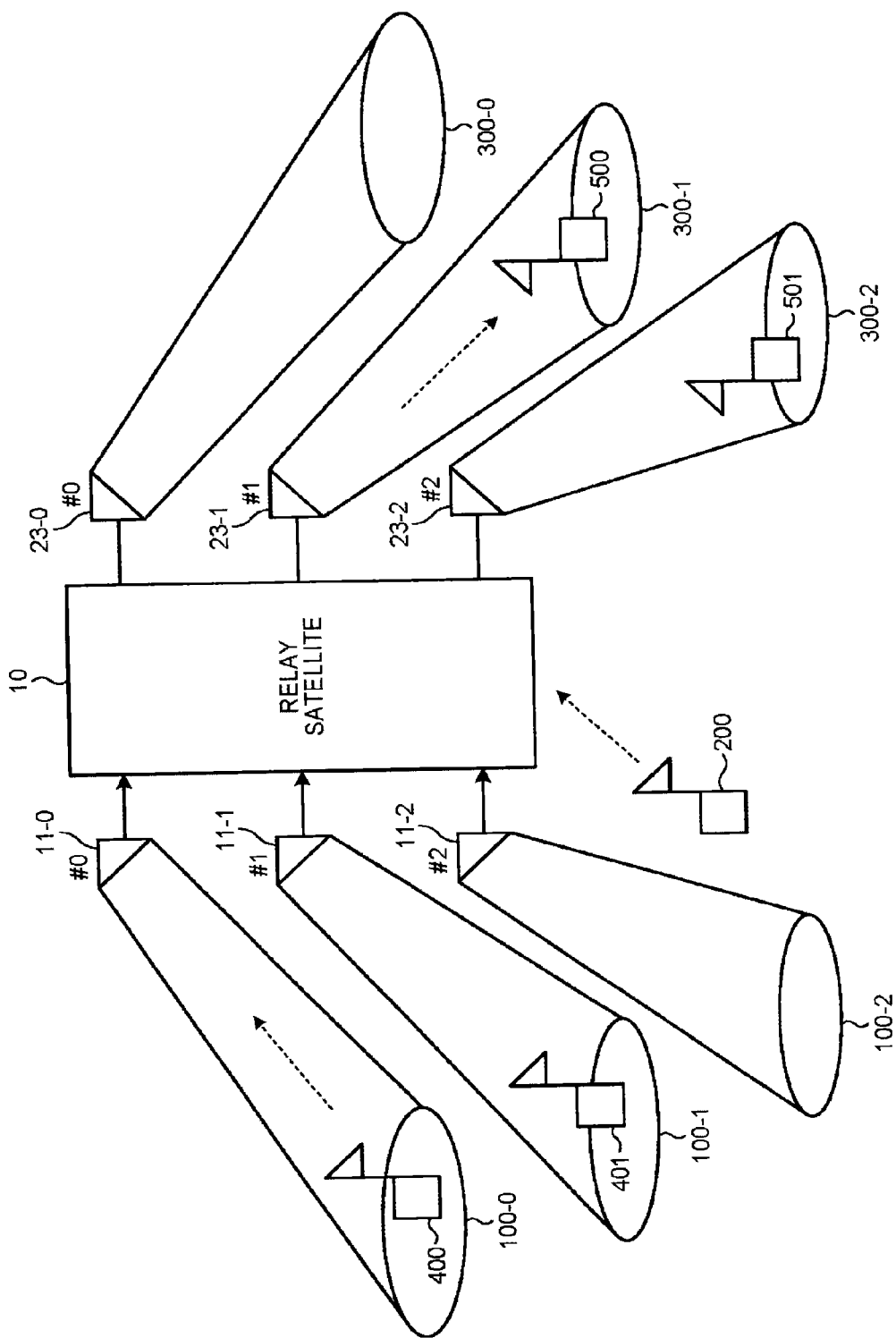
FIG. 11 is a diagram showing a configuration example of a satellite communication system in a fourth embodiment.

FIG. 11 is a diagram showing a configuration example of a satellite communication system including a relay apparatus in this embodiment. The configuration of the relay satellite 10 is the same as the configuration in the first embodiment. On a reception side, a transmission station 400 is present in the beam area and a transmission station 401 is present in the beam area 100-1. On a transmission side, a reception station 500 is present in the beam area 300-1 and a reception station 501 is present in the beam area 300-2.

As an example, processing is explained in which, in a process in which the transmission station 400 in the beam area 100-0 transmits the signal B shown in FIG. 2(*a*), the relay satellite 10 relays the signal B, and the reception station 500 located in the beam area 300-1 receives the signal B shown in FIG. 2(*b*), the relay satellite 10 performs, together with compensation of analog filter characteristics (RXF and TXF) of the relay satellite 10, compensation of characteristics of a transmission-side analog filter of the transmission station 400 and compensation of characteristics of a reception-side analog filter of the reception station 500.

First, before communication via the relay satellite 10 is started, the characteristics of the transmission-side analog filter of the transmission station 400 and the characteristics of the reception-side analog filter of the reception station 500 are calculated in advance.

Among the characters, the RX compensating unit 16-*n* of the relay satellite 10 can compensate for the transmission-side analog characteristic of the transmission station 400 in the same manner as a principle and a procedure for compensating for the filter of the RXF 13-*n* explained in the first embodiment. The TX compensating unit 18-*n* of the relay satellite 10 can compensate for the reception-side analog filter characteristic of the reception station 500 according to a principle and a procedure for compensating for the filter of the TXF 21-*n* explained in the first embodiment.

Therefore, the transmission station 400 calculates in advance a coefficient $W_A(i)$ for compensating for, with the RX compensating unit 16-*n*, transmission-side analog filter characteristics of the transmission station 400. Similarly, the reception station 500 calculates in advance a coefficient $W_B(i)$ for compensating for, with the TX compensating unit 18-*n*, reception-side analog characteristics of the reception station 500.

The number of coefficient data i is determined by a bandwidth of a communication signal. For example, in the case of the signal B, because the bandwidth is 5Fc as shown in FIG. 2(*a*), the number of coefficient data is i=5.

Subsequently, before starting communication of the signal B, the control station 200 receives the coefficient $W_A(i)$ from the transmission station 400 in another radio line or wired line. Similarly, before starting reception of the signal B, the control station 200 receives the coefficient $W_B(i)$ from the reception station 500 in another radio line or wired line.

According to a communication request of the signal B, the control station 200 performs connection control of the switch matrix 17 of the relay satellite 10 and sets the coefficient $W_A(i)$ in the RX compensating unit 16-0 of the relay satellite 10 and sets the coefficient $W_B(i)$ in the TX compensating unit 18-1 of the relay satellite 10. All the settings from the control station 200 to the relay satellite 10 are performed using another radio line.

Specifically, when a sub-channel number is represented as j (e{1, 2, 3, . . . , 8}), the control station 200 sets, in the RX compensating unit 16-0 of the relay satellite 10, a result obtained by complex-multiplying together a coefficient $W_R(j, 0)$ for filter compensation of the RXF 13-0 and a coefficient $W_A(j)$ equivalent to the same sub-channel number. Consequently, the RX compensating unit 16-0 can simultaneously compensate for both of the filter characteristics of the RXF 13-0 and the transmission-side analog filter characteristics of the transmission station 400.

Similarly, when a sub-channel number is represented as j (e{1, 2, 3, . . . , 8}), the control station 200 sets, in the TX compensating unit 18-1 of the relay satellite 10, a result obtained by complex-multiplying together a coefficient $W_T(j, 1)$ for filter compensation of the TXF 21-0 and a coefficient W(j) equivalent to the same sub-channel number. Consequently, the TX compensating unit 18-1 can simultaneously compensate for both of filter characteristics of the TXF 21-1 and reception-side analog filter characteristics of the reception station 500.

When the above setting is completed, the transmission station 400 transmits the signal B, the relay satellite 10 relays the signal B, and the reception station 500 receives the signal B. In this process, the compensation of the analog filter of the transmission station 400 and that of the RXF 13-0 of the relay satellite 10 are performed by the RX compensating unit 16-0. The compensation of the analog filter of the reception station 500 and the compensation of the TXF 21-1 of the relay satellite 10 are performed by the TX compensating unit 18-1.

Note that the same procedure can be taken when the communication between the transmission station 400 and the reception station 500 ends and is switched to communication between other ground stations (e.g., communication between the transmission station 401 and the reception station 501 shown in FIG. 11). The transmission station 401 and the reception station 501 calculate coefficients of their own stations in advance. The control station 200 sets the coefficients of the transmission station 401 and the reception station 501 of the relay satellite 10 respectively in the RX compensating unit 16-0 and the TX compensating unit 18-1 of the relay satellite 10.

In this way, the filter characteristics of the ground stations are calculated in advance and set in the relay satellite 10. Consequently, the satellite communication system including the relay satellite 10 can compensate for not only analog filter characteristics of the relay satellite 10 but also transmission and reception analog filter characteristics of all ground stations without adding a special circuit.

By compensating for the filter characteristics of the ground stations in the relay satellite 10 in this way, it is made possible to relax required specifications of the analog filters of the transmission station and the reception station on the ground that perform communication via the relay satellite 10. It is made possible to realize a reduction in circuit sizes and adjustment places of not only the relay satellite 10 but also the analog filters of the transmission station and the reception station on the ground.

As explained above, according to this embodiment, the relay satellite compensates for the analog filters of the reception station and the transmission station on the ground. Consequently, it is made possible to realize a reduction in development costs and adjustment workloads of not only the relay satellite but also the reception station and the transmission station on the ground.

Note that the control station 200 can retain in advance, as a table, coefficients for transmission filter compensation and coefficients for reception filter compensation of all (or a part) of ground stations connected to the satellite communication system. In this case, the control station 200 can save labor and time for receiving coefficient information from the ground stations every time the ground stations are connected. Therefore, it is made possible to reduce a line connection time.

Fifth Embodiment

In this embodiment, a satellite itself automatically compensates for the coefficients $W_R(m, n)$ and $W_T(m, n)$ for compensation so as to easily realize analog compensation and update of the coefficients.

When compensation of analog filters is performed, an administrator or the like of an operation system can manually carry out the compensation. However, the compensation takes time. It is also conceivable that, even if compensation is performed once, an amplitude/phase shift sometimes gently occurs again in units of hour, month, and year because of aged deterioration and temperature fluctuation. Therefore, in this embodiment, the coefficients $W_R(m, n)$ and $W_T(m, n)$ for compensation are automatically calculated in the relay satellite 10 to automatically compensate for the amplitude/phase shift using calculated values.

Note that the compensation carried out in this embodiment is performed by generating a non-modulated (CW) wave for correction inside the relay satellite 10. Therefore, the compensation is performed after stopping relay signal input and output to and from a relevant port and setting the relay satellite 10 in a standby state.

In general, the relay satellite 10 does not secure the number of ports necessary for actual operation but includes a plurality of auxiliary ports in preparation for a failure. Therefore, in the relay satellite 10, when the ports are sequentially set in a standby state and compensated, the compensation can be carried out according to procedures (1) to (6) below. Therefore, it is made possible to avoid a situation in which signal relay is once suspended.

Procedure (1) The relay satellite 10 sets up an auxiliary port and feeds a relay signal, which is the same as a relay signal to a compensation target port, to the auxiliary port.

Procedure (2) When the same signal starts to flow to both of the auxiliary port and the compensation target port, the relay satellite 10 relays, with a digital inside (e.g., the switch matrix 17), data of the auxiliary port at certain timing and at the same time stops data relay of the compensation target port. According to digital switching, the signal is relayed from the compensation target port to the auxiliary port without causing signal disconnection.

Procedure (3) The relay satellite 10 carries out, on the basis of a method explained below, automatic compensation of the transmission analog filter (the TXF 21-*n*) of the compensation target port.

Procedure (4) Similarly, the relay satellite 10 carries out, on the basis of the method explained below, automatic compensation of the reception analog filter (the RXF 13-*n*) of the compensation target port.

Procedure (5) After the compensation of the transmission and reception analog filters, the relay satellite 10 feeds the same relay signal not only to the auxiliary port but also the compensated port. However, the relay satellite 10 prevents, with the digital inside (e.g., the switch matrix 17), data of the compensated port from being output to control two signals not to be combined.

Procedure (6) When the same signal starts to flow to both of the compensation target port and the auxiliary port, the relay satellite 10 outputs, with the digital inside (e.g., the switch matrix 17), the data of the compensated port at certain timing and stops the data of the auxiliary port. According to this digital switching, the signal is relayed from the auxiliary port to the compensated port without causing signal disconnection.

The relay satellite 10 can avoid interruption of the relayed signal by sequentially automatically carrying out the compensation of the transmission and reception analog filters of each of the ports according to the above procedures. Note that, in the above example, the procedure for once shifting the relay signal from the compensation target port to the auxiliary port and returning the relay signal after the compensation is adopted. However, concerning the compensation of the auxiliary port, because the signal is not relayed already, the compensation can be performed at any time irrespective of the above procedures.

There is also a method of, on the operation system side, allocating a signal to be relayed (hereinafter may be referred to just as "relayed signal") to another frequency band or stopping, and eliminating a signal in a signal band treated by the compensation target port, switching the compensation target port to the auxiliary port, and relaying the signal again. In this case, because the relayed signal is once stopped, an operation limitation occurs. However, a switching procedure of the relay can be simplified. Note that, when a part of main ports is broken down and the auxiliary port also always needs to be operated, the signal to be relayed is once stopped and then the automatic compensation is carried out.

Details of the analog filter compensation carried out in the procedures (3) and (4) above are explained below. First, a method of automatically compensating for characteristics of the transmission analog filter (the TXF 21-*n*) is explained.

Figure 12:
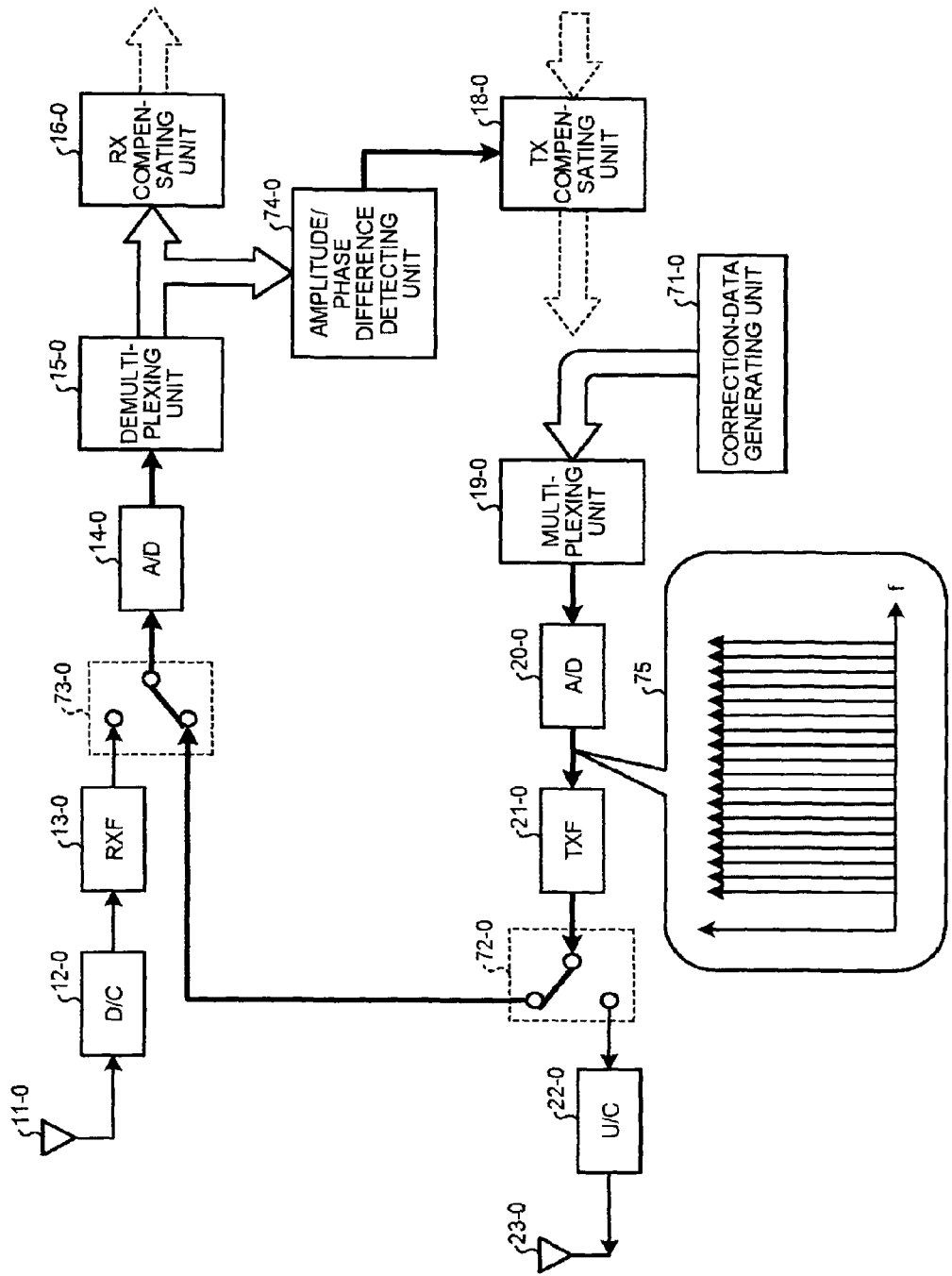
FIG. 12 is a diagram showing a configuration example of a relay satellite that automatically compensates for characteristics of a TXF in a fifth embodiment.

FIG. 12 is a diagram showing a configuration example of the relay satellite 10 that automatically compensates for characteristics of the TXF 21-0 in this embodiment. In addition to the configuration in the first embodiment, the relay satellite 10 includes a compensation-data generating unit 71-0, analog switches 72-0 and 73-0, and an amplitude/phase difference detecting unit 74-0. A signal spectrum 75 shown in FIG. 12 indicates an example of a signal spectrum after non-modulated data output from the correction-data generating unit 71-0 is multiplexed by the multiplexing unit 19-0 and D/A-converted by the D/A converter 20-0.

The correction-data generating unit 71-0 generates a correction baseband non-modulated signal. The analog switch 72-0 switches an output destination of a signal from the TXF 21-0. The analog switch 73-0 switches an input source of a signal to the A/D converter 14-0. The amplitude/phase difference detecting unit 74-0 calculates a coefficient for TXF compensation.

In the relay satellite 10, during the automatic compensation, the analog switch 72-0 connects an output of the TXF 21-0 to an input of the analog switch 73-0 rather than the up-converter 22-0. The analog switch 73-0 selects the output of the TXF 21-0 rather than the RXF 13-0. After the setting of the analog switches 72-0 and 73-0 is performed in this way, the correction-data generating unit 71-0 generates m correction baseband non-modulated signals $C_b$.

The baseband non-modulated signal $C_b$ is indicated by Formula (11). In the formula, m represents a demultiplexing/multiplexing number, Fc represents a sub-channel bandwidth, b represents a frequency number (e{1, 2, . . . , m}), A represents amplitude, and $\theta_b$ represents an initial phase. The initial phase $\theta_b$ can be randomized to reduce peak power of a multicarrier signal.

$$C_b = A\exp(j\theta_b) \quad (11)$$

Figure 13:
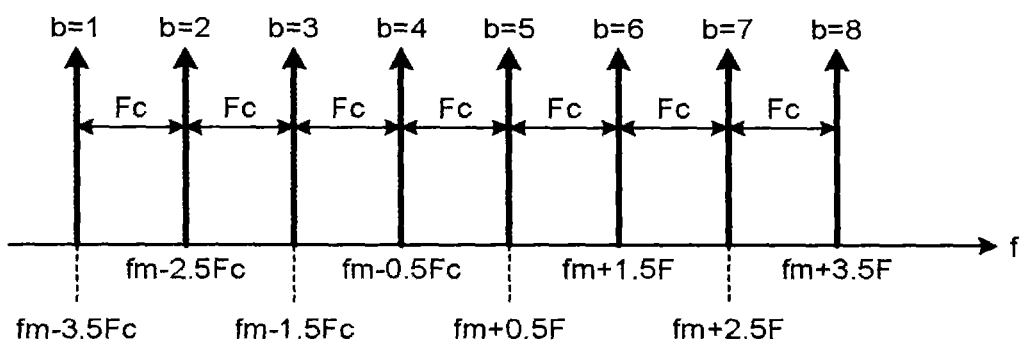
FIG. 13 is a diagram showing a frequency arrangement example of non-modulated signals for correction converted into multicarrier signals at an intermediate frequency fm, m=8.

After multiplexing the m baseband non-modulated signals, in some case, the multiplexing unit 19-0 converts a baseband into an intermediate frequency fm and converts the baseband non-modulated signals into, for example, a multicarrier signal shown in FIG. 13. FIG. 13 is a diagram showing a frequency arrangement example of each correction non-modulated signal converted into a multicarrier signal at the intermediate frequency fm, m=8. FIG. 13 shows a state in which eight correction non-modulated signals are arranged at a bandwidth Fc between the frequency fm −3.5 Fc and the frequency fm +3.5 Fc. The relay satellite 10 converts, with the D/A converter 20-0, the multicarrier signal into an analog signal according to settings of the analog switches 72-0 and 73-0 and thereafter inputs the analog signal to the A/D converter 14-0 via the TXF 21-0.

The A/D converter 14-0 samples the input multicarrier signal. The demultiplexing unit 15-0 demultiplexes a signal after the sampling into m reception baseband non-modulated signals. Note that, when the multicarrier signal is input to the demultiplexing unit 15-0 at the intermediate frequency $f_m$, the demultiplexing unit 15-0 performs demultiplexing after converting the intermediate frequency fm into a baseband.

A b-th reception baseband non-modulated signal $R_b$ is indicated by Formula (12). In the formula, b represents a frequency number (e{1, 2, . . . , m}), $\Delta A_b$ represents amplitude of the b-th reception baseband non-modulated signal, and $\Delta\theta_b$ represents a phase of the b-th reception baseband non-modulated signal.

$$R_b = \Delta_b \exp(j\Delta\theta_b) \quad (12)$$

The amplitude/phase difference detecting unit 74-0 has stored therein the baseband non-modulated signal $C_b$. As indicated by the following Formula (13), the amplitude/phase difference detecting unit 74-0 calculates a coefficient $W_T(m, 0)$ for TXF compensation by dividing the baseband non-modulated signal $C_b$ by the reception baseband non-modulated signal $R_b$.

$$\begin{aligned}W_T(m, 0) &= C_b / R_b \\ &= (\mathrm{Re}[C_b] + j\mathrm{Im}[C_b])/(\mathrm{Re}[R_b] + j\mathrm{Im}[R_b]) \\ &= (\mathrm{Re}[C_b] * \mathrm{Re}[R_b] + \mathrm{Im}[C_b] * \mathrm{Im}[R_b])/ \\ &\quad (\mathrm{Re}[R_b]^2 + \mathrm{Im}[R_b]^2) + \\ &\quad j(\mathrm{Im}[C_b] * \mathrm{Re}[R_b] - \mathrm{Re}[C_b] * \mathrm{Im}[R_b])/ \\ &\quad (\mathrm{Re}[R_b]^2 + \mathrm{Im}[R_b]^2)\end{aligned} \quad (13)$$

The amplitude/phase difference detecting unit 74-0 sets the coefficient $W_T(m, 0)$ calculated by Formula (13) in the TX compensating unit 18-0. If the coefficient $W_T(m, 0)$ is already set, the TX compensating unit 18-0 updates (corrects) the coefficient $W_T(m, 0)$. According to the series of processing, in this embodiment, the relay satellite 10 can automatically set, in the TX compensating unit 18-0, the coefficient $W_T(m, 0)$ for compensating for an amplitude/phase error of the TXF 21-0.

Note that, in the above explanation, the compensation concerning the TXF 21-0 in the zero-th port (n=0) is explained. However, coefficients $W_T(m, 1)$ and $W_T(m, 2)$ for compensating for the TXF 21-1 in the first port and the TXF 21-2 in the second port can be calculated in the same manner.

In the configuration shown in FIG. 8, when it is desired to further realize automatic compensation of the TX compensating units 42-0 and 42-1, the automatic compensation can be realized by the same method. For example, when a demultiplexing number of the demultiplexing units 41-0 and 41-1 and a multiplexing number of the multiplexing units 43-0 and 43-1 are k=4, it is also made possible that an interval of a correction CW signal is narrowed to ¼ of the interval shown in FIG. 13 and the eight CW signals shown in FIG. 13 are increased to thirty-two CW signals and then the CW signals are transmitted from the correction-data generating unit 71-0. In this case, the amplitude/phase difference detecting unit 74-0 divides outputs of the demultiplexing units 41-0 and 41-1 by a baseband non-modulated signal stored in advance to calculate a compensation coefficient for the TX compensating units 42-0 and 42-1 and sets the compensation coefficient in the TX compensating unit 45-0.

A method of automatically compensating for characteristics of the reception analog filter (the RXF 13-n) is explained.

Figure 14:
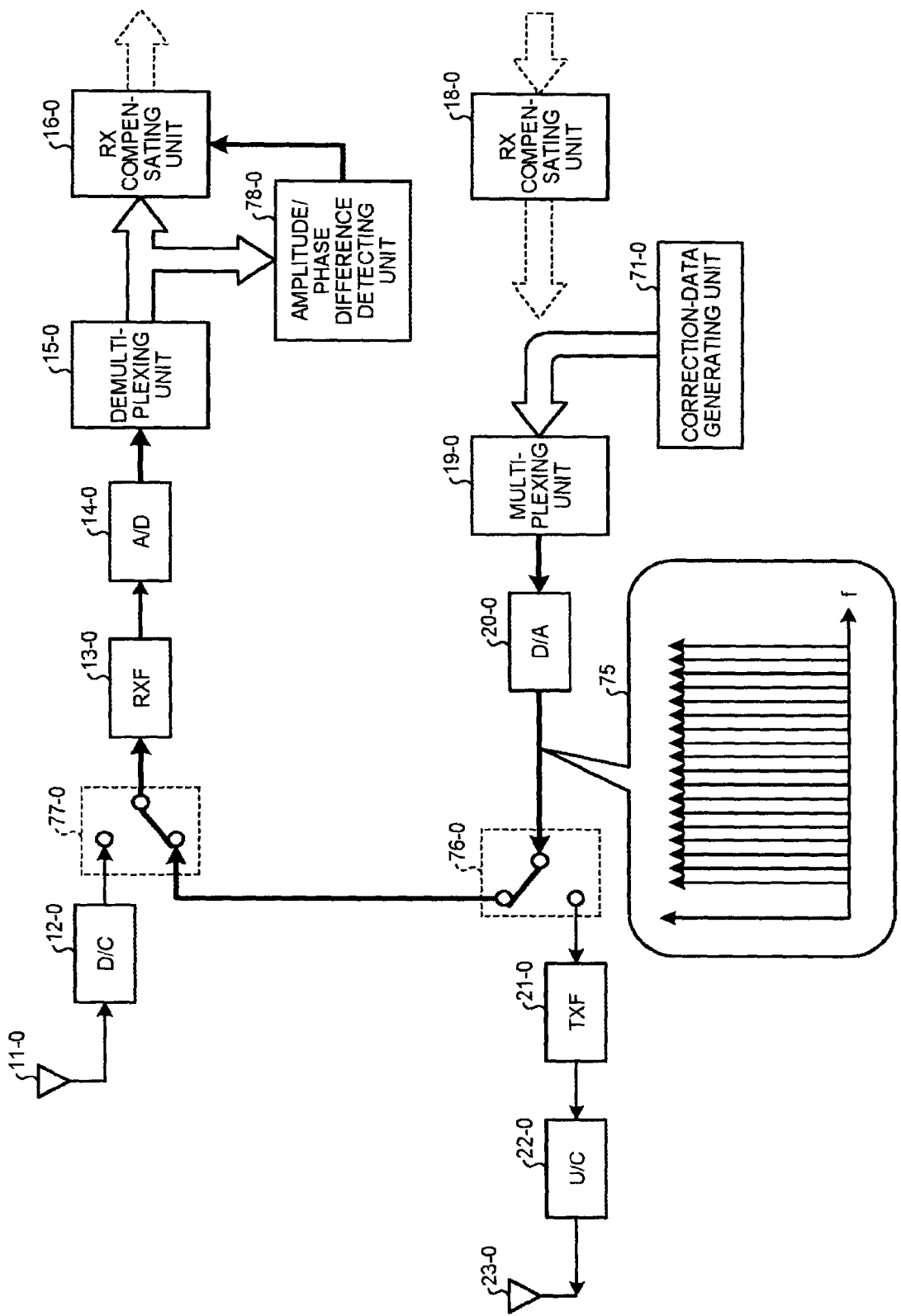
FIG. 14 is a diagram showing a configuration example of a relay satellite that automatically compensates for characteristics of an RXF in the fifth embodiment.

FIG. 14 is a diagram showing a configuration example of the relay satellite 10 that automatically compensates for characteristics of the RXF 13-0 in this embodiment. In addition to the configuration in the first embodiment, the relay satellite 10 includes a compensation-data generating unit 71-0, analog switches 76-0 and 77-0, and an amplitude/phase difference detecting unit 78-0.

The analog switch 76-0 switches an output destination of a signal from the D/A converter 20-0. The analog switch 77-0 switches an input source of a signal to the RXF 13-0. The amplitude/phase difference detecting unit 78-0 calculates a coefficient for RXF compensation.

In the relay satellite 10, during the automatic compensation, the analog switch 76-0 connects an output of the D/A converter 20-0 to an input of the analog switch 77-0 rather than the TXF 21-0. The analog switch 77-0 selects an output of the D/A converter 20-0 rather than the down-converter 12-0. After performing setting of the analog switches 76-0 and 77-0 in this way, the correction-data generating unit 71-0 generates the m correction baseband non-modulated signal $C_b$ according to the above Formula (11).

In the relay satellite 10, after multiplexing the m baseband non-modulated signals and converting the m baseband-non-modulated signals into a multicarrier signal, the multiplexing unit 19-0 inputs the multicarrier signal to the A/D converter 14-0 via the D/A converter 20-0 and the RXF 13-0. The A/D converter 14-0 samples the input multicarrier signal. The demultiplexing unit 15-0 demultiplexes a signal after the sampling into m reception baseband non-modulated signals.

When the b-th reception baseband non-modulated signal $R_b$ after the demultiplexing is represented by the above Formula (12), the amplitude/phase difference detecting unit 78-0 calculates the coefficient $W_R(m, 0)$ for RXF compensation according to Formula (14) like Formula (13). The amplitude/phase difference detecting unit 78-0 sets the coefficient $W_R(m, 0)$ in the RX compensating unit $$W_R(m, 0) = C_b / R_b \quad (14)$$

$$= (\text{Re}[C_b] * \text{Re}[R_b] + \text{Im}[C_b] * \text{Im}[R_b])/$$

$$(\text{Re}[R_b]^2 + \text{Im}[R_b]^2) +$$

$$j(\text{Im}[C_b] * \text{Re}[R_b] - \text{Re}[C_b] * \text{Im}[R_b])/$$

$$(\text{Re}[R_b]^2 + \text{Im}[R_b]^2)$$

The amplitude/phase difference detecting unit 78-0 sets the coefficient $W_R(m, 0)$ calculated by Formula (14) in the RX compensating unit 16-0. When the coefficient $W_R(m, 0)$ is already set, the RX compensating unit 16-0 updates (corrects) the coefficient $W_R(m, 0)$. According to the series of processing, in this embodiment, the relay satellite 10 can automatically set, in the RX compensating unit 16-0, the coefficient $W_R(m, 0)$ for compensating for an amplitude/phase error of the RXF 13-0.

Note that, in the above explanation, the compensation concerning the RXF 13-0 in the zero-th port (n=0) is explained. However, coefficients $W_R(m, 1)$ and $W_R(m, 2)$ for compensating for the RXF 13-1 in the first port and the RXF 13-2 in the second port can be calculated in the same manner.

In the configuration of the RX compensating unit 16-0 shown in FIG. 7, when it is desired to further realize automatic compensation of the RX compensating units 33-0 and 33-1, the automatic compensation can be realized by the same method. For example, when a demultiplexing number of the demultiplexing units 32-0 and 32-1 and a multiplexing number of the multiplexing units 34-0 and 34-1 are k=4, it is also possible that an interval of a correction CW signal is narrowed to ¼ of the interval shown in FIG. 13 and the eight CW signals shown in FIG. 13 are increased to thirty-two CW signals and then the CW signals are transmitted from the correction-data generating unit 71-0. In this case, the amplitude/phase difference detecting unit 78-0 divides outputs of the demultiplexing units 32-0 and 32-1 by a baseband non-modulated signal stored in advance so as to calculate a compensation coefficient for the RX compensating units 33-0 and 33-1 and sets the compensation coefficient in the RX compensating unit 16-0.

As explained above, according to this embodiment, the relay satellite 10 calculates the coefficients $W_R(m, n)$ and $W_T(m, n)$ for compensation by itself and automatically sets the coefficients $W_R(m, n)$ and $W_T(m, n)$. Consequently, compared with manual compensation, it is possible to reduce an adjustment time and realize a reduction in adjustment workloads.

Further, by cyclically performing the automatic compensation, that is, cyclically performing the update of the coefficients $W_R(m, n)$ and $W_T(m, n)$, even when an amplitude/phase shift of the analog filter of the relay satellite 10 has gently occurred in units of hour, month, and year because of aged deterioration and temperature fluctuation, the relay satellite 10 can secure communication quality of a relayed signal.

Sixth Embodiment

In the fifth embodiment, the automatic compensation concerning the frequency characteristics of the transmission analog filter (TXF) and the reception analog filter (RXF) in the baseband or the intermediate frequency band is explained. In this embodiment, a method of automatically compensating for frequency characteristics of the transmission analog filter in the up-converter 22-0 and the reception analog filter in the down-converter 12-0 as well according to the same procedure is explained.

As a premise, it is assumed that, before the automatic compensation of the analog filters of the up-converter and the down-converter is performed, automatic compensation concerning frequency characteristics of the transmission analog filter (TXF) and the reception analog filter (RXF) in the intermediate frequency band is completed according to the procedure explained in the fifth embodiment.

FIG. 15 is a diagram showing a configuration example of the relay satellite 10 that automatically compensates for characteristics of the up-converter 22-0 and the down-converter 12-0 in this embodiment. The down-converter 12-0 includes a frequency converting unit 81-0, a switch 85-0, a reception band-pass filter (BPF) 86-0, a switch 87-0, and a mixer 88-0. The frequency converting unit 81-0 includes a band-pass filter (BPF) 82-0, a local signal oscillator 83, and a mixer 84-0.

The frequency converting unit 81-0 converts an uplink frequency into a downlink frequency. The BPF 82-0 is an analog band-pass filter that allows a signal including a part of a signal band of an adjacent system to pass. The local signal oscillator 83 generates a signal for converting the uplink frequency into the downlink frequency. The mixer 84-0 converts an uplink signal into the downlink frequency from the uplink signal output from the BPF 82-0 and a local signal output from the local signal oscillator 83. The switch 85-0 switches an input source of a signal to the reception BPF 86-0. The reception BPF 86-0 extracts a signal converted into the downlink frequency. The switch 87-0 switches an input source of a signal to the mixer 88-0. The mixer 88-0 down-converts a correction multicarrier signal.

The up-converter 22-0 includes a local signal oscillator 89, a mixer 90-0, and a transmission band-pass filter (BPF) 91-0.

The local signal oscillator 89 generates a signal for conversion between a downlink frequency (Fd) and the intermediate frequency fm. The mixer 90-0 up-converts a correction multicarrier signal. The transmission BPF 91-0 outputs the correction multicarrier signal added with a frequency characteristic.

In general, in a satellite communication system, an uplink frequency and a downlink frequency are different. Therefore, the frequency converting unit 81-0 that converts the uplink frequency (Fu) into the downlink frequency (Fd) is provided as shown in FIG. 15. However, in a radio system in which the uplink frequency and the downlink frequency are the same, the frequency converting unit 81-0 is unnecessary.

As shown in FIG. 15, frequency bands of the reception BPF 86-0 and the transmission BPF 91-0 to be compensated are made common as the downlink frequency (Fd). Consequently, it is possible to compensate for the reception BPF 86-0 and the transmission BPF 91-0 with a method same as the automatic compensation of the transmission analog filter (TXF) and the reception analog filter (RXF) explained above.

First, the operation of the frequency converting unit 81-0 is explained. In the down-converter 12-0, the frequency converting unit 81-0 converts the uplink frequency Fu received by the reception antenna 11-0 into a downlink frequency. In the frequency converting unit 81-0, first, the BPF 82-0 allows a signal band of an own system including a part of a signal band of an adjacent system to pass.

Because the BPF 82-0 is provided not to capture many signals of other systems, a gradient of an out-band attenuation characteristic required of the BPF 82-0 can be gentle. Therefore, because the BPF 82-0 can be relatively easily realized and can be designed with an amplitude error and a group delay deviation in a band suppressed to be sufficiently small, the BPF 82-0 is not a target of compensation in this embodiment. When a signal of another system is absent in an adjacent frequency or, even if a signal of another system is present in the adjacent frequency, a reception level is sufficiently small, the BPF 82-0 can be deleted.

The mixer 84-0 multiplies together the uplink signal output from the BPF 82-0 and the local signal output from the local signal oscillator 83 and converts the uplink signal into the downlink frequency (Fd).

During a normal signal relay operation in which the automatic compensation is not performed, the reception BPF 86-0 extracts a signal converted into the downlink frequency (Fd) from a signal input through the switch 85-0, removes other unnecessary waves, and outputs the signal.

A compensation method for the reception BPF 86-0 is explained. Note that, before the reception BPF 86-0 is compensated, the automatic compensation concerning the frequency characteristics of the transmission analog filter (TXF) and the reception analog filter (RXF) in the intermediate frequency band is completed.

First, the switch 85-0 is switched to select an output of the mixer 90-0 rather than the mixer 84-0. In FIG. 14, the correction-data generating unit 71-0 generates and outputs a correction multicarrier signal. The D/A converter 20-0 outputs the D/A-converted correction multicarrier signal to the mixer 90-0 of the up-converter 22-0 via the switch 76-0 and the TXF 21-0.

In FIG. 15, the mixer 90-0 multiplies the correction multicarrier signal with the local signal generated by the local signal oscillator 89 and up-converts the correction multicarrier signal into the downlink frequency (Fd). The mixer 90-0 outputs the up-converted correction multicarrier signal to the reception BPF 86-0 via the switch 85-0. The reception BPF 86-0 adds a frequency characteristic to the correction multicarrier signal and outputs the correction multicarrier signal. The reception BPF 86-0 outputs the correction multicarrier signal added with the frequency characteristic to the mixer 88-0 via the switch 87-0. The mixer 88-0 multiplies the correction multicarrier signal with the local signal generated by the local signal oscillator 89 and down-converts the correction multicarrier signal into the intermediate frequency (fm) or the baseband.

In this way, the signal having the uplink frequency (Fu) is converted into the downlink frequency by the frequency converting unit 81-0. Therefore, the up-converter 22-0 and the down-converter 12-0 can use the local signal oscillator 89 in common.

Thereafter, in the relay satellite 10, the correction multicarrier signal down-converted into the intermediate frequency (fm) or the baseband is output to the amplitude/phase difference detecting unit 78-0 through the switch 77-0, the RXF 13-0, the A/D converter 14-0, and the demultiplexing unit 15-0 as shown in FIG. 14.

The amplitude/phase difference detecting unit 78-0 calculates a coefficient $W_B(m, 0)$ for compensation of the reception BPF 86-0 in the same manner as the processing for calculating a coefficient for RXF compensation and outputs the coefficient $W_B(m, 0)$ to the RX compensating unit 16-0.

The RX compensating unit 16-0 complex-multiplies the already-set coefficient $W_A(m, 0)$ for compensation of RXF with the coefficient $W_B(m, 0)$ for compensation input anew and resets a result of the multiplication as a new coefficient for compensation. According to this series of processing, the RX compensating unit 16-0 can compensate for errors of filters of both of the RXF 13-0 and the reception BPF 86-0.

A compensation method for the transmission BPF 91-0 is explained. Note that, before the transmission BPF 91-0 is compensated, the automatic compensation concerning the frequency characteristics of the transmission analog filter (TXF) and the reception analog filter (RXF) in the intermediate frequency band is completed.

First, the switch 87-0 is switched to select an output of the transmission BPF 91-0 rather than the reception BPF 86-0. In FIG. 12, the correction-data generating unit 71-0 generates and outputs a correction multicarrier signal. The D/A converter 20-0 outputs the D/A-converted correction multicarrier signal to the mixer 90-0 of the up-converter 22-0 via the TXF 21-0 and the switch 72-0.

In FIG. 15, the mixer 90-0 multiplies the correction multicarrier signal with the local signal generated by the local signal oscillator 89-0 and up-converts the correction multicarrier signal into the downlink frequency (Fd). The mixer 90-0 outputs the up-converted correction multicarrier signal to the transmission BPF 91-0. The transmission BPF 91-0 outputs the correction multicarrier signal added with a frequency characteristic to the mixer 88-0 via the switch 87-0. The mixer 88-0 multiplies the correction multicarrier signal with the local signal generated by the local signal oscillator 89 and down-converts the correction multicarrier signal into the intermediate frequency (fm) or the baseband.

Thereafter, in the relay satellite 10, the correction multicarrier signal down-converted into the intermediate frequency (fm) or the baseband is output to the amplitude/phase difference detecting unit 74-0 through the RXF 13-0, the switch 73-0, the A/D converter 14-0, and the demultiplexing unit 15-0 as shown in FIG. 12.

The amplitude/phase difference detecting unit 74-0 calculates a coefficient $W_C(m, 0)$ for compensation of the transmission BPF 61-0 in the same manner as the processing for calculating a coefficient for TXF compensation and outputs the coefficient $W_C(m, 0)$ to the TX compensating unit 18-0.

The TX compensating unit 18-0 complex-multiplies the already-set coefficient $W_T(m, 0)$ for compensation of TXF with the coefficient $W_C(m, 0)$ for compensation input anew and resets a result of the multiplication as a new coefficient for compensation. According to this series of processing, the TX compensating unit 18-0 can compensate for errors of filters of both of the TXF 21-0 and the transmission BPF 91-0.

Note that, in FIG. 15, the local signal oscillators 83 and 89 are shared by each of the ports (n=0, 1, and 2). Therefore, the number of components can be reduced.

In FIG. 13, the frequency converting unit 81-0 is provided between the reception antenna 11-0 and the switch 85-0. However, it is also possible that the frequency converting unit 81-0 is moved to a position between the transmission BPF 91-0 and the transmission antenna 23-0, a frequency of the oscillator 89 is changed to change a frequency output from the transmission BPF 91-0 to the uplink frequency (Fu), and frequencies of the transmission BPF 91-0 and the reception BPF 86-0 are changed to set the uplink frequency Fu as the center frequency. In this case, the frequency converting unit 81-0 converts a frequency of a signal output from the transmission BPF 91-0 into Fd from Fu and outputs the signal from the transmission antenna 23-0.

In general, a downlink signal is amplified by an amplifier and output. Therefore, when the frequency converting unit 81-0 is moved to a position between the transmission BPF 91-0 and the transmission antenna 23-0, and the reception BPF 86-0 and the transmission BPF 91-0 are changed to be configured to handle the signal having the uplink frequency (Fu) in this way, it is made possible to eliminate a likelihood that a signal having the downlink frequency Fd amplified by strong electric power sneaks into the reception BPF 86-0, the transmission BPF 91-0, and the like and give an adverse effect as interference at the same frequency.

As explained above, according to this embodiment, the relay satellite 10 further automatically compensates for the frequency characteristics of the transmission analog filter in the up-converter and the reception analog filter in the down-converter. Consequently, compared with the fifth embodiment, it is made possible to further reduce the adjustment time and realize a reduction in adjustment workloads.

Seventh Embodiment

In this embodiment, a method of realizing a satisfactory analog compensation characteristic while suppressing an increase amount of a digital circuit size in the same manner according to a method different from the method explained in the first embodiment.

The overall configuration of the relay satellite 10 including a relay apparatus in this embodiment is the same as the configuration shown in FIG. 1. However, functions are different from the configurations of the RX compensating units 16-0 to 16-2, the TX compensating units 18-0 to 18-2, the demultiplexing units 15-0 to 15-2, and the multiplexing units 19-0 to 19-2.

In this embodiment, the RX compensating units 16-0 to 16-$n$ have a configuration in which the RX compensating unit 31-0 is left and the other components are deleted in the configuration shown in FIG. 7 in the first embodiment.

Similarly, the TX compensating units 18-0 to 18-2 have a configuration in which the RX compensating unit 45-0 is left and the other components are deleted in the configuration shown in FIG. 8 in the first embodiment. In this way, the function of demultiplexing the m demultiplexed signals at finer frequency resolution or the function of multiplexing the demultiplexed signals is deleted and the circuit sizes of the RX compensating unit and the TX compensating unit are reduced.

Figure 16:
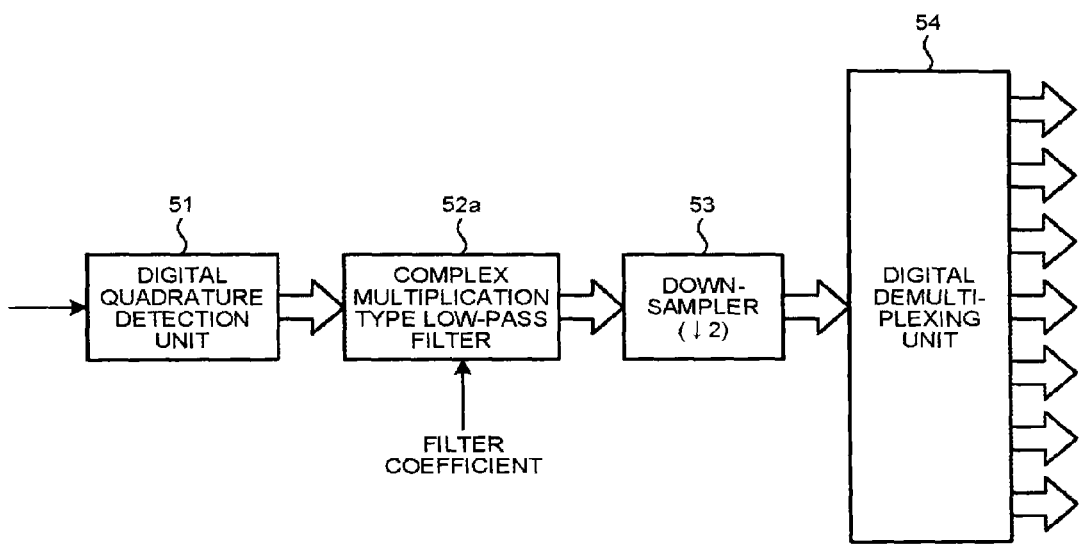
FIG. 16 is a diagram showing a configuration example of a demultiplexing unit in a seventh embodiment.
Figure 17:
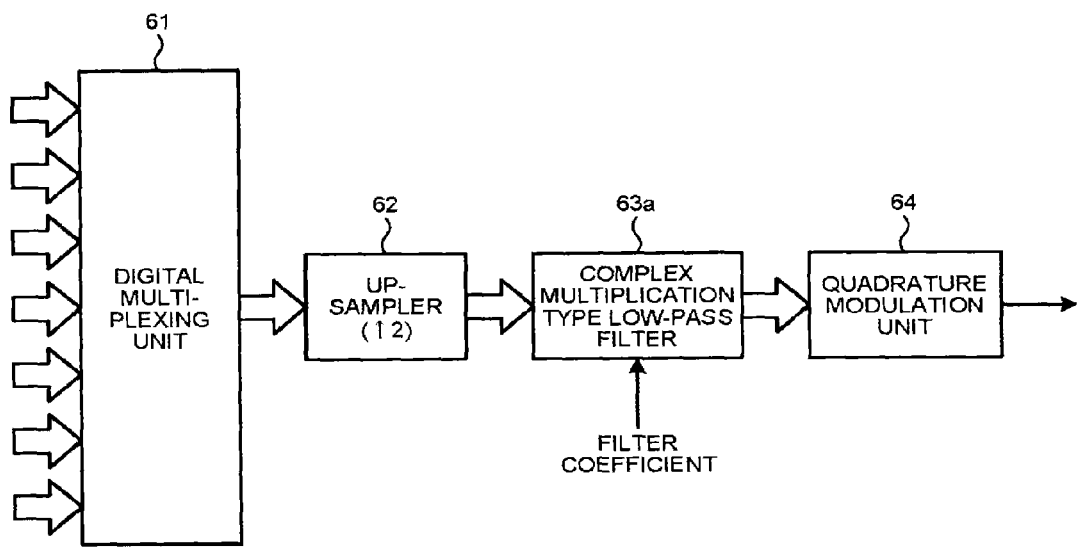
FIG. 17 is a diagram showing a configuration example of a multiplexing unit in the seventh embodiment.

The configurations of the demultiplexing units 15-0 to 15-2 and the multiplexing units 19-0 to 19-2 in this embodiment are explained. FIG. 16 is a diagram showing a configuration example of the demultiplexing unit 15-$n$ in this embodiment. The demultiplexing unit 15-$n$ includes a low-pass filter of a complex multiplication type (a complex multiplication type low-pass filter 52$a$) instead of the low-pass filter 52 shown in FIG. 9. FIG. 17 is a diagram showing a configuration example of the multiplexing unit 19-$n$ in this embodiment. The multiplexing unit 19-$n$ includes a low-pass filter of the complex multiplication type (a complex multiplication type low-pass filter 63$a$) instead of the low-pass filter 63 shown in FIG. 10.

In this embodiment, an amplitude error and a group delay deviation of an analog filter are roughly compensated using these complex multiplication type low-pass filters. Residual error components not fully compensated are precisely compensated by the RX compensating unit 16-$n$ and the TX compensating unit 18-$n$.

In particular, the complex multiplication type low-pass filter has a first object of compensating for the amplitude error and the group delay deviation of the analog filter until gradients thereof are made gentle. Naturally, when the number of filter taps of the complex multiplication type low-pass filters 52$a$ and 63$a$ is increased, an analog filter characteristic can be completely compensated by the complex multiplication type low-pass filters 52$a$ and 63$a$ alone without being further compensated by the RX compensating unit 16-$n$ and the TX compensating unit 18-$n$. However, a circuit size increases.

Therefore, in this embodiment, like the low-pass filters 52 and 63, the complex multiplication type low-pass filters 52$a$ and 63$a$ are compensated in a range of the number of filter taps necessary for removal of harmonics, which is the original purpose.

Like the low-pass filters 52 and 63, the complex multiplication type low-pass filters 52$a$ and 63$a$ simultaneously compensate for a frequency-to-amplitude characteristic and a frequency-to-group delay characteristic while removing harmonics. To realize the compensation, in the complex multiplication type low-pass filters 52$a$ and 63$a$, unlike the low-pass filters 52 and 63, tap coefficients thereof are complex numbers. Multiplication performed in an FIR filter is complex multiplication. Therefore, even if the low-pass filters 52 and 63 and the complex multiplication type low-pass filters 52$a$ and 63$a$ have the same number of taps, a required number of multipliers increased to a double in the complex multiplication type low-pass filters 52$a$ and 63$a$. However, an increase amount of the required number of multipliers is very small compared with the circuit size of the entire apparatus.

Figure 18:
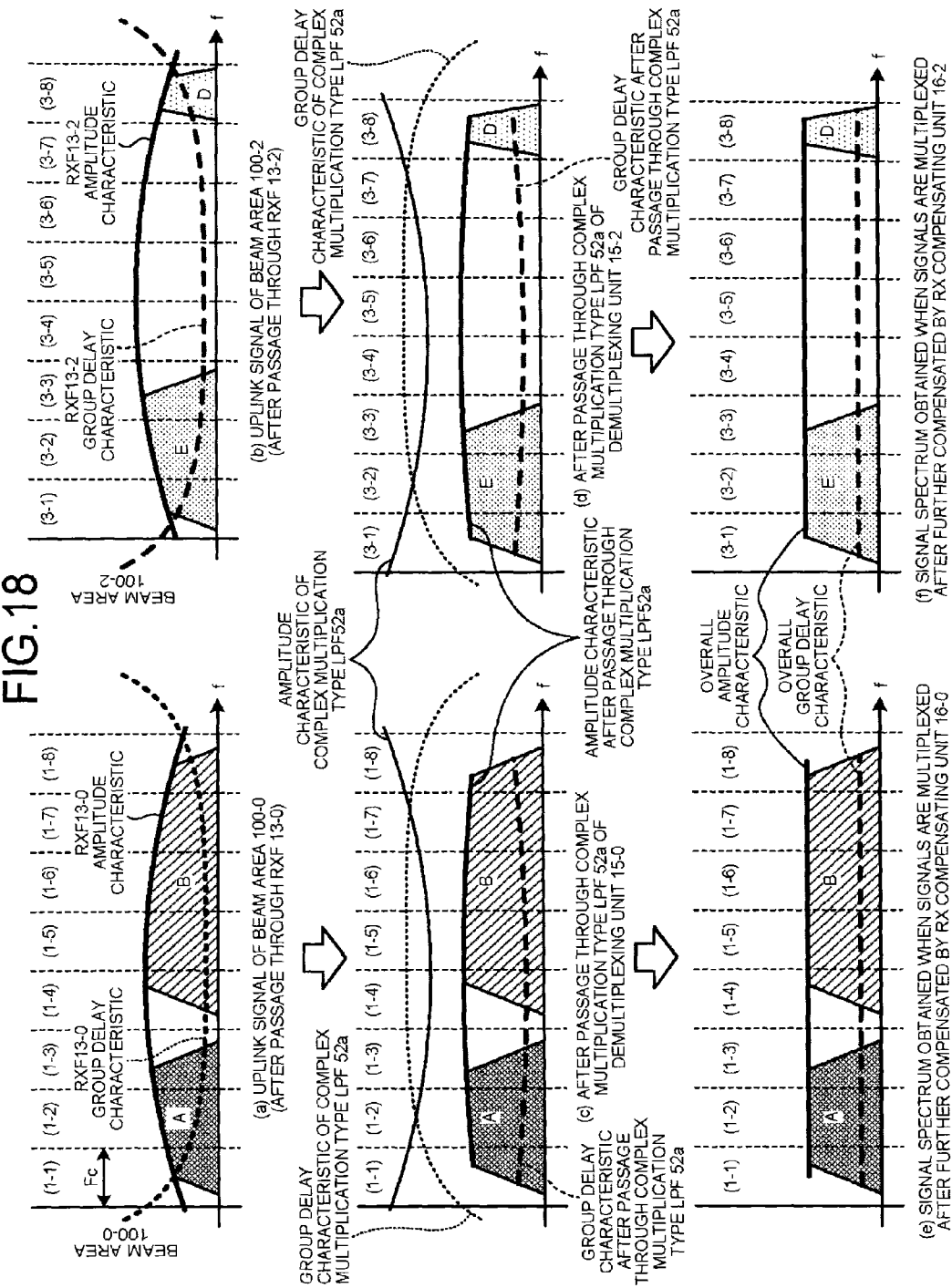
FIG. 18 is a diagram showing an example of compensation processing on a reception side in the seventh embodiment.

Compensation processing for a signal in this embodiment is explained. FIG. 18 is a diagram showing an example of compensation processing on a reception side in this embodiment. FIG. 18($a$) shows uplink signals A and B from the beam area 100-1 added with an error of the RXF 13-0. FIG. 18($b$) shows uplink signals E and D from the beam area 100-2 added with an error of the RXF 13-2.

First, the signals A and B shown in FIG. 18($a$) are roughly compensated into the signals A and B shown in FIG. 18($c$) according to an amplitude characteristic and a group delay characteristic of the complex multiplication type low-pass filter (LPF) 52$a$ in the demultiplexing unit 15-0 shown in FIG. 18($c$). As shown in FIG. 18($c$), a slight gentle amplitude error and a group delay deviation remain.

Similarly, the signals E and D shown in FIG. 18($b$) are roughly compensated into the signals E and D shown in FIG. 18($d$) according to an amplitude characteristic and a group delay characteristic of the complex multiplication type low-pass filter (LPF) 52$a$ in the demultiplexing unit 15-2 shown in FIG. 18($d$). As shown in FIG. 18($d$), a slight gentle amplitude error and a group delay deviation remain.

In this way, the complex multiplication type low-pass filter does not realize complete compensation, but compensates signals to a degree for gently suppressing the remaining amplitude error and the remaining group delay deviation in a limited circuit size.

In the relay satellite 10, these signals compensated by the complex multiplication type low-pass filter are further compensated by an RX compensating unit at a post stage according to a method same as the method explained in the first embodiment. In FIG. 18($e$), a signal spectrum multiplexed after being compensated by the RX compensating unit 16-0 is shown. In FIG. 18($f$), a signal spectrum multiplexed after being compensated by the RX compensating unit 16-2 is shown.

As shown in FIGS. 18($e$) and 18($f$), an entire amplitude characteristic and an entire group delay characteristic can be planarized by compensation processing at two stages for compensating for, with REX compensating units at the post stage, a gentle error not fully compensated by the complex multiplication type low-pass filter.

Figure 19:
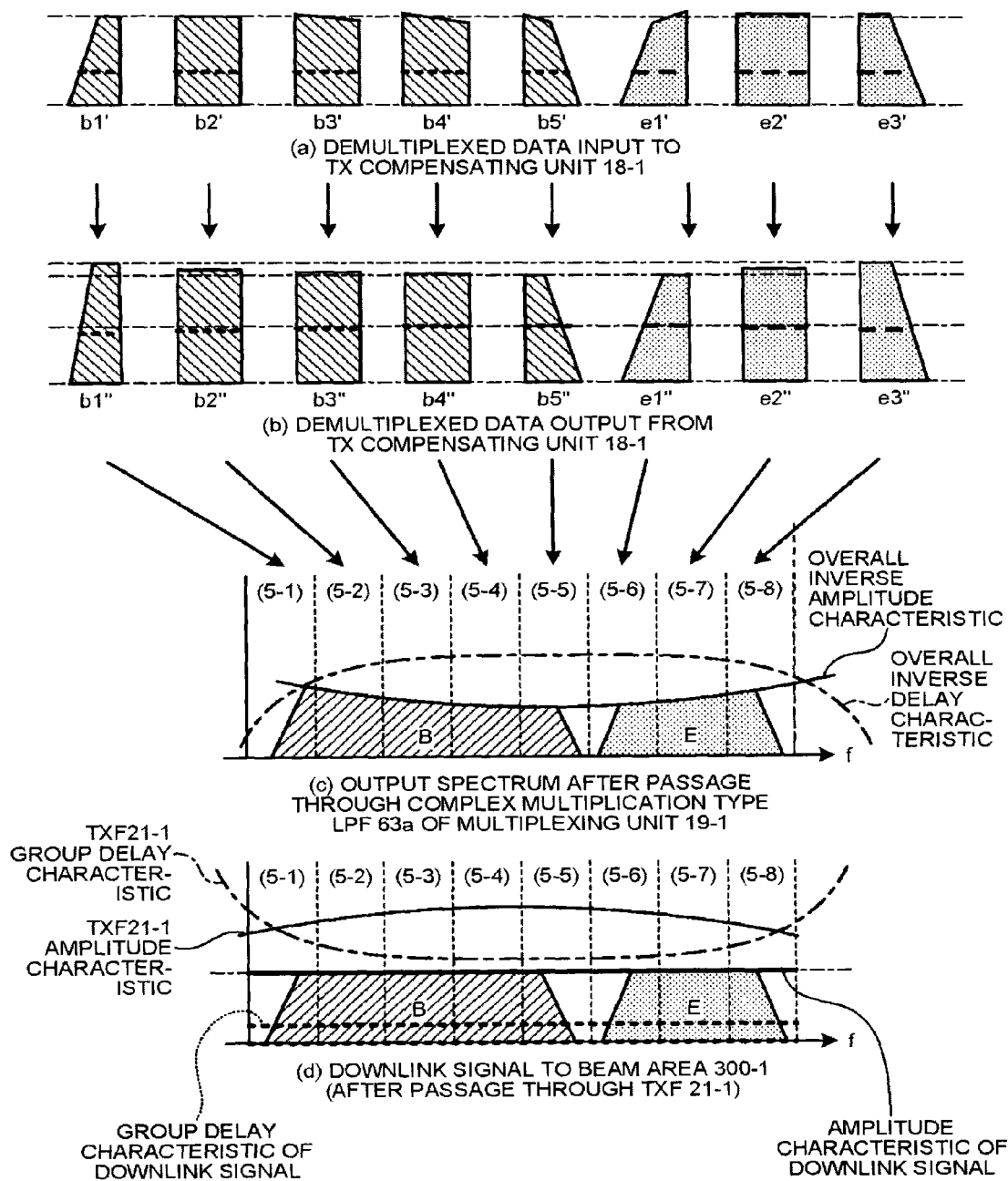
FIG. 19 is a diagram showing an example of compensation processing on a transmission side in the seventh embodiment.

FIG. 19 is a diagram showing an example of compensation processing on a transmission side in this embodiment. FIG. 19(a) shows demultiplexed data input to the TX compensating unit 18-1. On the other hand, as shown in FIG. 19(b), the TX compensating unit 18-1 applies inverse amplitude compensation and inverse group delay deviation compensation in units of bandwidths Fc to the demultiplexed data. At this point, because frequency resolution of the compensation is as rough as Fc, an amplitude error and a group delay deviation remain.

Therefore, after multiplexing these eight data, the multiplexing unit 19-1 compensates for the residual amplitude error and the residual group delay deviation with the complex multiplication type low-pass filter in the multiplexing unit 19-1. As shown in FIG. 19(c), the multiplexing unit 19-1 outputs a signal for cancelling an amplitude characteristic and a group delay characteristic of the TXF 21-1 at the post stage. According to such compensation processing at the two stages, the amplitude characteristic and the group delay characteristic can be planarized as shown in FIG. 19(d) in a downlink signal to the beam area 300-1.

As explained above, according to this embodiment, on the reception side, the compensation is performed by the complex multiplication type low-pass filter included in the demultiplexing unit and thereafter the compensation is further performed by the RX compensating unit at the post stage. On the transmission side, the compensation is performed by the RX compensating unit and thereafter the compensation is performed by the complex multiplication type low-pass filter included in the multiplexing unit at the post stage.

Note that the tap coefficients of the filters set in the complex multiplication type low-pass filters 52a and 63a can be configured to be rewritable. In this case, the frequency-to-amplitude characteristic and the frequency-to-group delay characteristic of the complex multiplication low-pass filters can be freely changed. Therefore, it is made possible to realize fine amplitude adjustment and group delay adjustment to absorb individual differences of transmission and reception analog filter characteristics together with the coefficients $W_R$ and $W_T$ given to the RX compensating unit and the TX compensating unit. Further, it is made possible to realize fine amplitude adjustment and group delay adjustment with a configuration for transmitting the tap coefficients from a ground station and setting the tap coefficients even after satellite launch. Consequently, because required performance of the analog filters can be relaxed, it is made possible to realize a reduction in the costs, the capacity, and the weight of the analog filters. As in the fifth and sixth embodiments, a configuration for realizing the automatic compensation incorporating the complex multiplication type low-pass filters 52a and 63a can be adopted.

REFERENCE SIGNS LIST

10 Relay satellite
11-0 to 11-2 Reception antennas
12-0 to 12-2 Down-converters
13-0 to 13-2 Reception analog filters (RXFs)
14-0 to 14-2 A/D converters
15-0 to 15-2 Demultiplexing units
16-0 to 16-2 Reception-side compensating (RX compensating) units
17 Switch matrix
18-0 to 18-2 Transmission-side compensating (TX compensating) units
19-0 to 19-2 Multiplexing units
20-0 to 20-2 D/A converters
21-0 to 21-2 Transmission analog filters (TXFs)
22-0 to 22-2 Up-converters
23-0 to 23-2 Transmission antennas
31-0 Reception-side compensating (RX compensating) unit
32-0, 32-1 Demultiplexing units
33-0, 33-1 Reception-side compensating (RX compensating) units
34-0, 34-1 Multiplexing units
35 Delay unit
41-0, 41-1 Demultiplexing units
42-0, 42-1 Transmission-side compensating (TX compensating) units
43-0, 43-1 Multiplexing units
44 Delay unit
45-0 Transmission-side compensating (TX compensating) unit
51 Digital quadrature detection unit
52 Low-pass filter
52a Complex multiplication type low-pass filter
53 Down-sampler
54 Digital demultiplexing unit
61 Digital multiplexing unit
62 Up-sampler
63 Low-pass filter
63a Complex multiplication type low-pass filter
64 Quadrature modulation unit
71-0 Compensation-data generating unit
72-0, 73-0 Analog switches
74-0 Amplitude/phase difference detecting unit
75 Signal spectrum
76-0, 77-0 Analog switches
78-0 Amplitude/phase difference detecting unit
81-0 Frequency converting unit
82-0 Band-pass filter (BPF)
83 Local signal oscillator
84-0 Mixer
85-0 Switch
86-0 Reception band-pass filter (BPF)
87-0 Switch
88-0 Mixer
89 Local signal oscillator
90-0 Mixer
91-0 Transmission band-pass filter (BPF)
100-0 to 100-2 Beam areas (uplink)
200 Control station
300-0 to 300-2 Beam areas (downlink)
400, 401 Transmission stations
500, 501 Reception stations

The invention claimed is:
1. A demultiplexing apparatus comprising:
a reception analog filter that extracts a baseband signal from a received signal;
an analog-digital converter that converts the baseband signal extracted by the reception analog filter into a digital signal;
a demultiplexer that demultiplexes the digital signal converted by the analog-digital converter into a plurality of demultiplexed signals;
a reception-side compensator that
digitally compensates for an analog characteristic of the reception analog filter with respect to the demultiplexed signals demultiplexed by the demultiplexer, further demultiplexes each of one or more demultiplexed signals among the digitally compensated demultiplexed signals into a plurality of further demultiplexed signals, and digitally compensates for the analog characteristic of the reception analog filter with respect to the further demultiplexed signals, and thereafter multiplexes the digitally compensated further demultiplexed signals; and a multiplexer that multiplexes the digitally compensated further demultiplexed signals digitally compensated by the reception-side compensator, and wherein the analog characteristic of the reception analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

2. The demultiplexing apparatus according to claim 1, further comprising a memory that stores a plurality of reception-side coefficients having a frequency characteristic opposite to the frequency characteristic of the reception analog filter, wherein the reception-side compensator selects a reception-side coefficient from the memory and uses the reception-side coefficient to perform compensation for cancelling the analog characteristic of the reception analog filter.

3. The demultiplexing apparatus according to claim 2, wherein the reception-side compensator receives the reception-side coefficient from a control station that controls the demultiplexing apparatus.

4. A demultiplexing apparatus comprising:

a reception analog filter that extracts a baseband signal from a received signal;

an analog-digital converter that converts the baseband signal extracted by the reception analog filter into a digital signal;

a demultiplexer that demultiplexes the digital signal converted by the analog-digital converter into a plurality of demultiplexed signals;

a reception-side compensator that digitally compensates for an analog characteristic of the reception analog filter with respect to the demultiplexed signals demultiplexed by the demultiplexer, acquires a characteristic of a transmission station analog filter included in a transmission station that transmits the received signal to the demultiplexing apparatus, and further digitally compensates the plurality of demultiplexed signals for the characteristic of the transmission station analog filter; and a multiplexer that multiplexes the further digitally compensated demultiplexed signals digitally compensated by the reception-side compensator, wherein the analog characteristic of the reception analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

5. The demultiplexing apparatus according to claim 4, further comprising a memory that stores a plurality of reception-side coefficients having a frequency characteristic opposite to the frequency characteristic of the reception analog filter, wherein the reception-side compensator selects a reception-side coefficient from the memory and uses the reception-side coefficient to perform compensation for cancelling the analog characteristic of the reception analog filter.

6. The demultiplexing apparatus according to claim 5, wherein the reception-side compensator receives the reception-side coefficient from a control station that controls the demultiplexing apparatus.

7. A demultiplexing apparatus comprising:

a reception analog filter that extracts a baseband signal from a received signal;

an analog-digital converter that converts the baseband signal extracted by the reception analog filter into a digital signal;

a demultiplexer that compensates for the analog characteristic of the reception analog filter using a complex multiplication type low-pass filter with respect to the digital signal converted by the analog-digital converter, and demultiplexes the compensated digital signal into a plurality of demultiplexed signals;

a reception-side compensator that further digitally compensates for an analog characteristic of the reception analog filter with respect to the compensated demultiplexed signals demultiplexed by the demultiplexer; and a multiplexer that multiplexes the further compensated demultiplexed signals digitally compensated by the reception-side compensator, wherein the analog characteristic of the reception analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

8. The demultiplexing apparatus according to claim 7 further comprising a memory that stores a plurality of reception-side coefficients having a frequency characteristic opposite to the frequency characteristic of the reception analog filter, wherein the reception-side compensator selects a reception-side coefficient from the memory and uses the reception-side coefficient to perform compensation for cancelling the analog characteristic of the reception analog filter.

9. The demultiplexing apparatus according to claim 8, wherein the reception-side compensator receives the reception-side coefficient from a control station that controls the demultiplexing apparatus.

10. A multiplexing apparatus comprising:

a demultiplexer that demultiplexes a digital signal into a plurality of demultiplexed signals;

a transmission analog filter that extracts a baseband signal from an analog signal;

a transmission-side compensator that digitally compensates for an analog characteristic of the transmission analog filter with respect to the demultiplexed signals demultiplexed by the demultiplexer, further demultiplexes each of one or more digitally compensated demultiplexed signals into a plurality of further demultiplexed signals, further digitally compensates for the analog characteristic of the transmission analog filter with respect to the further demultiplexed signals, and thereafter multiplexes the compensated further demultiplexed signals into a set of multiplexed signals;

a multiplexer that multiplexes the set of multiplexed signals digitally compensated by the transmission-side compensator into a single multiplexed signal; and a digital-analog converter that converts the single multiplexed signal multiplexed by the multiplexer into an analog signal from which the transmission analog filter extracts the baseband signal, wherein the analog characteristic of the transmission analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

11. The multiplexing apparatus according to claim 10, further comprising a memory that stores a different plurality of transmission-side coefficients having a frequency characteristic opposite to the frequency characteristic of the transmission analog filter, wherein the transmission-side compensator selects a transmission-side coefficient from the memory and uses the transmission-side coefficient to perform compensation for cancelling the analog characteristic of the transmission analog filter.

12. The multiplexing apparatus according to claim 11, wherein the transmission-side compensator receives transmission-side coefficient from a control station that controls the multiplexing apparatus.

13. A multiplexing apparatus comprising:
a demultiplexer that demultiplexes a digital signal into a plurality of demultiplexed signals;
a transmission analog filter that extracts a baseband signal from an analog signal;
a transmission-side compensator that
digitally compensates for an analog characteristic of the transmission analog filter with respect to the demultiplexed signals demultiplexed by the demultiplexer,
acquires a characteristic of a reception station analog filter included in a reception station, which receives a signal from the multiplexing apparatus, and
further digitally compensates for the characteristic of the reception station analog filter characteristic;
a multiplexer that multiplexes the further digitally compensated demultiplexed signals digitally compensated by the transmission-side compensator into a multiplexed signal; and
a digital-analog converter that converts the multiplexed signal multiplexed by the multiplexer into the analog signal from which the transmission analog filter extracts the baseband signal, wherein the analog characteristic of at least one of the reception station analog filter and the transmission analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

14. The multiplexing apparatus according to claim 13, further comprising a memory that stores a different plurality of transmission-side coefficients having a frequency characteristic opposite to the frequency characteristic of the transmission analog filter, wherein the transmission-side compensator selects a transmission-side coefficient from the memory and uses the transmission-side coefficient to perform compensation for cancelling the analog characteristic of the transmission analog filter.

15. The multiplexing apparatus according to claim 14, wherein the transmission-side compensator receives the transmission-side coefficient from a control station that controls the multiplexing apparatus.

16. A multiplexing apparatus comprising:
a demultiplexer that demultiplexes a digital signal into a plurality of demultiplexed signals;
a transmission analog filter that extracts a baseband signal from an analog signal;
a transmission-side compensator that digitally compensates for an analog characteristic of the transmission analog filter with respect to the demultiplexed signals demultiplexed by the demultiplexer;
a multiplexer that multiplexes the digitally compensated demultiplexed signals digitally compensated by the transmission-side compensator into a multiplexed signal, and
further compensates for the analog characteristic of the transmission analog filter with respect to the multiplexed signal using a complex multiplication type low-pass filter; and
a digital-analog converter that converts the further compensated multiplexed signal into an analog signal, wherein the analog characteristic of the transmission analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

17. The multiplexing apparatus according to claim 16, further comprising a memory that stores a different plurality of transmission-side coefficients having a frequency characteristic opposite to the frequency characteristic of the transmission analog filter, wherein the transmission-side compensator selects a transmission-side coefficient from the memory and uses the transmission-side coefficient to perform compensation for cancelling the analog characteristic of the transmission analog filter.

18. The multiplexing apparatus according to claim 17, wherein the transmission-side compensator receives the transmission-side coefficient from a control station that controls the multiplexing apparatus.

19. A relay apparatus that outputs, from one or more output ports, signals received from one or more input ports, the relay apparatus comprising:
a number of demultiplexing apparatuses as many as or more than a number of the input ports, each demultiplexing apparatus comprising:
a reception analog filter that extracts a baseband signal from a received signal;
an analog-digital converter that converts the baseband signal extracted by the reception analog filter into a digital signal;
a demultiplexer that demultiplexes the digital signal converted by the analog-digital converter into a plurality of demultiplexed signals;
a reception-side compensator that
digitally compensates for an analog characteristic of the reception analog filter with respect to the demultiplexed signals demultiplexed by the demultiplexer, further demultiplexes each of one or more demultiplexed signals into a plurality of further demultiplexed signals,
further digitally compensates for the analog characteristic of the reception analog filter with respect to the further demultiplexed signals, and
multiplexes the further digitally compensated further demultiplexed signals into a set of multiplexed signals; and
a multiplexer that multiplexes the set of multiplexed signals into a single multiplexed signal;
the relay apparatus further comprising a number of multiplexing apparatuses as many as or more than a number of the output ports, each multiplexing apparatus comprising:
a demultiplexer that demultiplexes a digital signal into a plurality of demultiplexed signals;
a transmission analog filter that extracts a baseband signal from an analog signal;
a transmission-side compensator that digitally compensates for an analog characteristic of the transmission analog filter with respect to the demultiplexed signals demultiplexed by the demultiplexer,
further demultiplexes the digitally compensated demultiplexed signals into a plurality of further demultiplexed signals,
further digitally compensates for the analog characteristic of the transmission analog filter with respect to the further demultiplexed signals, and
multiplexes the further digitally compensated further demultiplexed signals into a set of multiplexed signals;
a multiplexer that multiplexes the set of multiplexed signals into a single multiplexed signal;
a digital-analog converter that converts the single multiplexed signal multiplexed by the multiplexer into an analog signal from which the transmission analog filter extracts the baseband signal; and
a switch matrix that is disposed between the demultiplexing apparatuses and the multiplexing apparatuses, that receives signals output from the demultiplexing apparatuses as inputs, that rearranges the input signals in a frequency direction and allocates the input signals to an output port to a desired beam area, and that outputs the input signals to the multiplexing apparatus connected to the output port for the desired beam area,
wherein the analog characteristic of at least one of the reception analog filter and the transmission analog filter includes at least one of an amplitude characteristic, a group delay characteristic, a phase characteristic, a frequency characteristic, a frequency-to-group delay characteristic, a frequency-to-amplitude/group delay characteristic, and a frequency-to-amplitude/phase characteristic.

20. The relay apparatus according to claim 19, further comprising:
a memory that stores a different plurality of transmission-side coefficients having a frequency characteristic opposite to the frequency characteristic of the transmission analog filter in the multiplexing apparatus;
a correction-data generator that generates a correction non-modulated signal and outputs the correction non-modulated signal to the multiplexer of the multiplexing apparatus; and
a transmission-side amplitude/phase difference detector that calculates transmission-side coefficient on the basis of a plurality of digital signals output from the demultiplexer of the demultiplexing apparatus, wherein
in the multiplexing apparatus, the multiplexer multiplexes a non-modulated signal from the correction-data generator, outputs the multiplexed non-modulated signal to the demultiplexing apparatus after passing the multiplexed non-modulated signal through the transmission analog filter of the multiplexing apparatus,
in the demultiplexing apparatus, when the non-modulated signal multiplexed by the multiplexing apparatus is received, the demultiplexer demultiplexes the multiplexed non-modulate signal and outputs the non-modulated signal to the transmission-side amplitude/phase difference detector without allowing the non-modulated signal to pass through the reception analog filter of the demultiplexing apparatus,
the transmission-side amplitude/phase difference detector outputs the calculated transmission-side coefficient to a transmission-side compensator of the multiplexing apparatus, and
the transmission-side compensator of the multiplexing apparatus performs, using the transmission-side coefficient received from the transmission-side amplitude/phase difference detector, digital compensation for cancelling the analog characteristic of the transmission analog filter.

21. The relay apparatus according to claim 20, wherein when the demultiplexing apparatus includes, at a pre-stage of the reception analog filter, a down-converter that down-converts a received signal and the multiplexing apparatus includes, at a post stage of the transmission analog filter, an up-converter that up-converts a transmission signal,
in the multiplexing apparatus, the up-converter up-converts the multiplexed non-modulated signal and outputs the non-modulated signal to the down-converter of the demultiplexing apparatus after passing the multiplexed non-modulated signal through a transmission-side band-pass filter included in the up-converter, and
in the demultiplexing apparatus, when the down-converter receives the multiplexed non-modulated signal, the down-converter down-converts the non-modulated signal without allowing the non-modulated signal to pass through a reception-side band-pass filter included in the down-converter, and the demultiplexer demultiplexes the multiplexed non-modulated signal and outputs the non-modulated signal to the transmission-side amplitude/phase difference detector.

22. The relay apparatus according to claim 19, further comprising:
a memory that stores a different plurality of transmission-side coefficients having a frequency characteristic opposite to the frequency characteristic of the transmission analog filter in the multiplexing apparatus;
a correction-data generator that generates a correction non-modulated signal and outputs the correction non-modulated signal to the multiplexer of the multiplexing apparatus; and
a reception-side amplitude/phase difference detector that calculates a reception-side coefficient on the basis of a plurality of digital signals output from the demultiplexer of the demultiplexing apparatus, wherein
in the multiplexing apparatus, the multiplexer multiplexes a non-modulated signal from the correction-data generator and outputs the multiplexed non-modulated signal to the demultiplexing apparatus without allowing the non-modulated signal to pass a transmission analog filter of the multiplexing apparatus, in the demultiplexing apparatus, when the non-modulated signal multiplexed by the multiplexing apparatus is received, the demultiplexer demultiplexes the multiplexed non-modulate signal and outputs the non-modulated signal to the transmission-side amplitude/phase difference detector after passing the multiplexed non-modulated signal through a reception analog filter of the demultiplexing apparatus itself, the reception-side amplitude/phase difference detector outputs the calculated reception-side coefficient to a reception-side compensator of the demultiplexing apparatus, and the reception-side compensator of the demultiplexing apparatus performs, using the reception-side coefficient received from the reception-side amplitude/phase difference detector, digital compensation for cancelling the analog characteristic of the reception analog filter.

23. The relay apparatus according to claim 22, wherein when the demultiplexing apparatus includes, at a pre-stage of the reception analog filter, a down-converter that down-converts a received signal and the multiplexing apparatus includes, at a post stage of the transmission analog filter, an up-converter that up-converts a transmission signal, in the multiplexing apparatus, the up-converter up-converts the multiplexed non-modulated signal and outputs the non-modulated signal to the down-converter of the demultiplexing apparatus without allowing the non-modulated signal to pass through a transmission-side band-pass filter included in the up-converter, and in the demultiplexing apparatus, when the down-converter receives the multiplexed non-modulated signal, the down-converter down-converts the non-modulated signal after passing the multiplexed non-modulated signal through a reception-side band-pass filter included in the down-converter, and the demultiplexer demultiplexes the multiplexed non-modulated signal and outputs the non-modulated signal to the reception-side amplitude/phase difference detector.

* * * * *